United States Patent
Jogand-Coulomb et al.

(10) Patent No.: US 12,050,679 B2
(45) Date of Patent: Jul. 30, 2024

(54) SYSTEM AND METHOD FOR PROVIDING AGGREGATED CREDENTIALS WITH ASSURANCE LEVELS

(71) Applicant: HID Global CID SAS, Suresnes (FR)

(72) Inventors: Fabrice Jogand-Coulomb, Aix en Provence (FR); Jean-Baptiste Milan, Jupiter, FL (US)

(73) Assignee: HID Global CID SAS, Suresnes (FR)

( * ) Notice: Subject to any disclaimer, the term of this patent is extended or adjusted under 35 U.S.C. 154(b) by 285 days.

(21) Appl. No.: 17/593,772

(22) PCT Filed: Apr. 1, 2020

(86) PCT No.: PCT/EP2020/059280
§ 371 (c)(1),
(2) Date: Sep. 24, 2021

(87) PCT Pub. No.: WO2020/201368
PCT Pub. Date: Oct. 8, 2020

(65) Prior Publication Data
US 2022/0222330 A1    Jul. 14, 2022

Related U.S. Application Data

(60) Provisional application No. 62/828,694, filed on Apr. 3, 2019, provisional application No. 62/827,626, filed on Apr. 1, 2019.

(51) Int. Cl.
*G06F 21/45* (2013.01)
(52) U.S. Cl.
CPC .................... *G06F 21/45* (2013.01)

(58) Field of Classification Search
CPC ................................................ G06F 21/45
See application file for complete search history.

(56) References Cited

U.S. PATENT DOCUMENTS

| | | | |
|---|---|---|---|
| 9,710,636 B1* | 7/2017 | Redpath | G06K 19/07749 |
| 10,084,606 B2* | 9/2018 | Abt, Jr. | H04L 9/3247 |
| 10,303,593 B2* | 5/2019 | Katagiri | G06F 21/64 |
| 10,600,506 B2* | 3/2020 | Blum | G06F 21/6254 |
| 10,700,893 B1* | 6/2020 | Krishnamurthy | H04L 12/4633 |
| 11,019,059 B2* | 5/2021 | Lelcuk | G06F 21/36 |
| 11,349,669 B1* | 5/2022 | Floyd | G06F 21/54 |
| 2017/0109759 A1* | 4/2017 | Korb | G06Q 30/018 |

(Continued)

FOREIGN PATENT DOCUMENTS

WO  WO-2020201368 A1  10/2020

OTHER PUBLICATIONS

"International Application Serial No. PCT/EP2020/059280, International Search Report mailed Aug. 19, 2020", 6 pgs.

(Continued)

*Primary Examiner* — Viral S Lakhia
(74) *Attorney, Agent, or Firm* — Schwegman Lundberg & Woessner, P.A.

(57) ABSTRACT

Various systems and methods for using credentials are described herein. In an example, the system is configured to generate and issue electronic credentials that may include aggregate credentials from various issuers. In another example, a query statement is used to express relationships between credential data elements and obtain a subset of data corresponding to the query.

19 Claims, 18 Drawing Sheets

(56) References Cited

U.S. PATENT DOCUMENTS

| | | | | |
|---|---|---|---|---|
| 2019/0130099 A1* | 5/2019 | Yom-Tov | ............ | G06F 21/6245 |
| 2019/0319939 A1* | 10/2019 | Hamel | .................... | G06F 21/33 |
| 2020/0050788 A1* | 2/2020 | Feuz | .................... | H04L 63/101 |
| 2020/0193033 A1* | 6/2020 | Kurmi | .................... | H04L 9/0894 |
| 2020/0218704 A1* | 7/2020 | Lauer | .................... | G06F 16/215 |
| 2020/0233962 A1* | 7/2020 | Chantry | ................. | G06F 8/311 |

OTHER PUBLICATIONS

"International Application Serial No. PCT/EP2020/059280, Invitation to Pay Additional Fees mailed Jun. 29, 2020", 9 pgs.
"International Application Serial No. PCT/EP2020/059280, Written Opinion mailed Aug. 19, 2020", 7 pgs.
"European Application Serial No. 20717804.7, Response Filed Apr. 13, 2022 to Communication Pursuant to Rules 161(2) and 162 EPC mailed Oct. 8, 2021", 22 pgs.
"Canadian Application Serial No. 3,135,815, Examiners Rule 86(2) Report mailed Dec. 20, 2023", 5 pgs.

\* cited by examiner

SYSTEM AND METHOD FOR PROVIDING AGGREGATED CREDENTIALS WITH ASSURANCE LEVELS

PRIORITY CLAIM

This application is a national stage application under 35 U.S.C. § 371 of PCT Application Serial No. PCT/EP2020/059280, filed Apr. 1, 2020, which claims the benefit of priority to U.S. Provisional Patent Application Ser. No. 62/827,626, filed Apr. 1, 2019, and U.S. Provisional Patent Application Ser. No. 62/828,694, filed Apr. 3, 2019, each of which is incorporated by reference herein in its entirety.

TECHNICAL FIELD

Embodiments described herein generally relate to electronic or digital credential systems, and in particular, to aggregating, verifying, issuing, and using personal credentials.

BACKGROUND

Identity documents, such as identity cards, may have multiple pieces of information stored on them. Some countries have begun a move to identification cards (e.g., ePassports) that include a microchip or integrated circuit that electronic stores information. A national identification card may include basic information, such as a person's name, home address, date of birth, age, or gender. Additionally, a national identity card may include security mechanisms such as an electronic security certificate, anti-counterfeit printing techniques, or seals.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
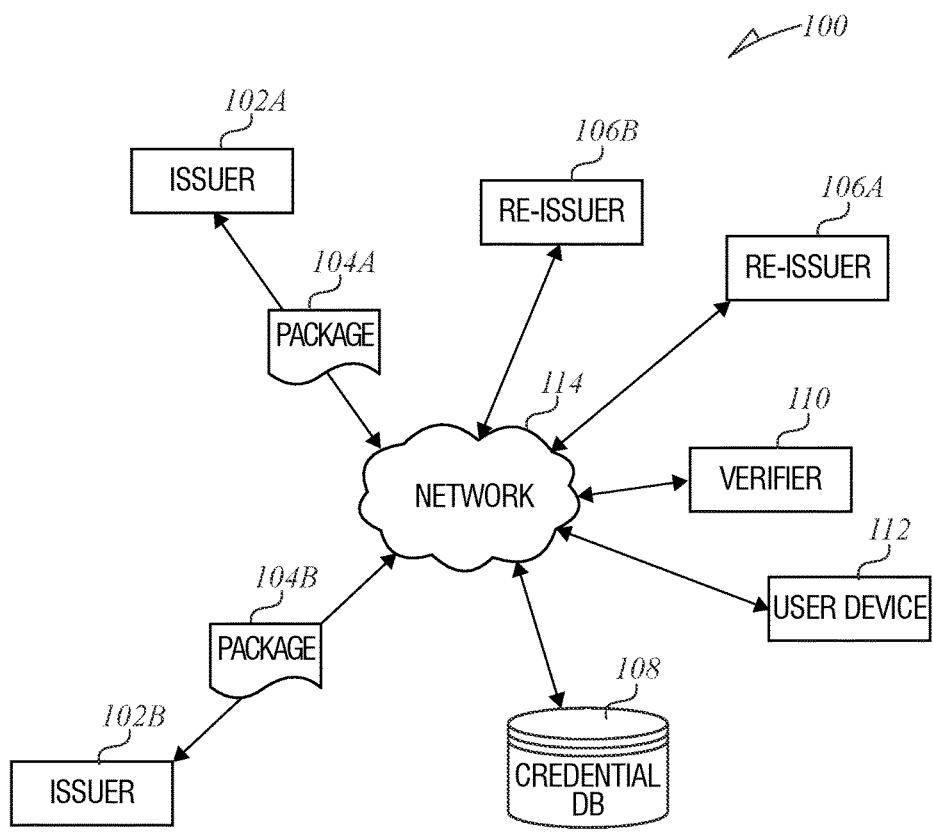
FIG. 1 is a block diagram illustrating a credential system, according an embodiment.

In the following description, for purposes of explanation, numerous specific details are set forth in order to provide a thorough understanding of some example embodiments. It will be evident, however, to one skilled in the art that the present disclosure may be practiced without these specific details.

Entities such as the government, Department of Motor Vehicles (DMV), universities, healthcare providers, financial institutions, utilities companies, airlines, etc. issue credentials. These entities may store similar or duplicate user data. For instance, a government issued identification card or driver's license may include the associated individual's picture, name, date of birth (DOB), height, weight, eye color, social security number (SSN), etc. An individual's student ID may include some of the same information, but may also include a student ID number that is unique to the school issuing the ID. Additionally, each of these identification documents (e.g., driver's license and student ID) may have an issue data and/or an expiration date.

Many people often carry a mobile communication device and would prefer to have their documents accessible via their mobile communication device rather than carrying separate physical documents. On a mobile communication device, the notion of physical documents doesn't have to be. Data minimization which returns only what the verifier requires and no more is another aspect that minimizes the document aspect especially when considering data from—in the physical world—different documents.

While convenience is improved by carrying a single device, the user experience is subject to challenges resulting from aggregating data and duplicate information. For example, a verifier may request your name, but which "document" should be used when there are multiple documents with the duplicated data of your name? Should all possible documents be presented for the user to select or is there a better way?

Also, in the physical world, the end user can indifferently present any kind of identity document according to a specific context. For example, a user may present a passport at border control but use a student ID for a discount ticket at the movie. Specifying a context in the electronic world isn't simple. Finally, in the physical world, the end user may present multiple documents at once and implicitly establish a relationship between them. For example, for a road control scenario, a user may present a driving license, car registration, and car insurance. The verifier (e.g., police officer) will understand that each document is related based on data relationships between the documents. Implicit relationships do not exist in the electronic world. These shortcomings, along with others, are addressed in the system described herein.

The present disclosure describes an improved credential system that provides a portable, electronically verifiable, and aggregated credential. Identity credentials (e.g., documents, cards, mobile profiles, etc.) include information such as a first and last name, a date of birth, an address, etc. In the digital world, each piece of information is a data element and these data elements are combined into a package that is issued to a target user. The aggregated credential brings together information from multiple issuers rather than duplicating the information. For example, if an insurance credential is issued to a user based on a government identification credential, the aggregated insurance credential references into the government identification credential to supply the user's name rather than copying the name into the insurance credential. This reference to the government credential avoids data duplication and the attendant synchronization problems to keep information up to date across many different issuers of information. A package may be further associated with a confidence level, which informs about the relevance of the issuer for the issued data elements and can be used to request any government issued identity data whether from mobile driving license, mobile identity or digital travel credentials.

As for any kind of electronic document, electronic verification requires what is commonly referred to in the physical world as a card reader. While for the physical world, visual verification is part of the verification to check Level 1 to Level 3 security features, in the mobile context one relies only on electronic verification. As such, verification of credentials issued to a mobile device requires an application that checks integrity and authenticity of data. For example, the mobile device may validate the issuer signature and may perform additional tasks.

In some embodiments, an issuer starts its issuance process by collecting and verifying data from one or more other issuers. The issuer may either embed the data from another issuer and reissue along with the new credentials or issue the new credentials as an attribute to such data (and which may reference such data). When issuing an attribute, the issuer may alternatively collect a reference to the data elements (that may have been duplicated in the physical world) and not their actual value itself. The data may be in an electronic format that includes a unique identifier of the source document and may further include the unique reference of target data elements from that source document. The aggregated credential system prepares the data to be issued to the user's mobile or personal device.

Having a digital credential provides several advantages. The issuer may sign the information issued to the mobile device as for typical electronic documents in the physical world. When one or more references to data elements from one or more other elements are used, then an explicit relationship between issued documents is expressed by the issuer.

The verifier may also express a relationship between packages the data elements come from. For example, a verifier may request boarding pass data elements and a portrait from any identity document whose demographic matches with the boarding pass. The boarding pass data and identity data may be in different packages. The verifier expresses a relationship between the packages, such as the full name of the passenger. This relationship is used to select the correct identity data (e.g., a portrait) of the corresponding passenger who is associated with the boarding pass. To proceed, the verifier associates the request with a query construct that is described here. The query may use a syntax similar to Structured Query Language (SQL). The verifier may use a query to assert relationships between data elements on the user device being interrogated. The query may be used on simple non-aggregated credentials or on aggregated credentials. While the request may specify a type of document or package (e.g. mobile driving license), the query may simply express a relationship between data elements or packages. For example, first name and last name from any identity document. The query may also specify information not related to the value of data elements but instead metadata of the data package, data elements, or the like. For example, a minimum confidence level may be specified for data elements from identity documents, which effectively selects information from a government issued identity package. These features and more are discussed below.

The present disclosure is organized as follows:
1) System Overview
2) Package Data Structure
3) Package Issuance
4) Package Updates and Deletion
5) User Application
6) Verifier Operations Some terms are provided here for common reference. It is understood that these terms are non-limiting and that other terms, phrases, or descriptions of operations, components, or devices in the systems and methods described may be used.

Package—a Package is a, possibly empty, collection of tag/value pairs of data. The package can also include metadata, such as commands, preferences, etc. The tag of the data pair may be referred to as a name, identifier, field identifier, label, or description. The value may be an actual value or a reference to an actual value. The reference may be directed to another package, another tag/value pair within the same or different package, or elsewhere. A Package may include metadata about the Package, such as a hash (or hashes) of data elements, Issuer Signature, Package Expiration, confidence level(s), or the like. Confidence levels may be used to indicate confidence on a data element, a package, or metadata describing a data element or package.

Credential—a Credential is an encapsulation of one or more packages. Data elements in a package may be included by referencing a data element in another package. A data element reference may retain the confidence level of the original referenced data element (or the source package for the referenced data element).

Issuer—an Issuer is a person, entity, app, service, or other platform that provides a Package. The Issuer signature may attest to the authenticity, validity, and correctness of data contained in the Package.

A package is typically issued to an Application that runs on a user device which may be a mobile phone, a PC, a tablet, etc. A package may typically contain (new) data element(s), reference(s) to data element(s) from other packages or both. There may also be packages as well without any elements. Referenced data element(s) may be from packages from the same issuer, from another one or more other issuers, or a combination thereof. Packages may be aggregated to multiple packages that may be standalone or aggregated too. This allows an issuer to define a relationship between its issued information and already issued data. A package may also carry data elements with tags from different namespaces and may also reference data with tags from one or more different namespaces.

Data that is provided by an Issuer may have an associated Assurance Level for a set of data elements. An Assurance Level (or confidence level) is an indication of the trustworthiness of the data which may take in account different aspects from the life cycle of this data and in particular the relevance of the issuer for such data elements. The Assurance Level may be a numerical range, a letter grade, or other indication. Data issued by an Original Issuer may have the highest Assurance Level. As data is incorporated by reference by Re-Issuers in derivative Packages, the Assurance Level may decrease stepwise. By analyzing the Assurance Level of data contained in a Package, one may be able to see how many steps away the data in the current Package is from the Original Issuer. As used herein, the term "assurance level" is interchangeable with the term "confidence level."

Holder—a Holder is a person who is the legitimate owner of the information in the package or credential. For an identity package, the Holder matches with the identity information.

Holder device—the device where the Holder stores the received package. Often, the Holder device is a mobile phone (e.g., a smartphone). The Holder device may run a Holder App—commonly named a wallet App—where such data are managed during presentation to a Verifier. The Holder App may be a low-level application, such as a Basic Input Output System (BIOS) or other firmware, a system-level application (e.g., an operating system or a component of an operating system), a user-level application (e.g., an installed application on the Holder), or a remote application (e.g., a web-based application executing via a browser on the Holder).

Verifier—a Verifier is a device or an application that receives and verifies data from an issuer package. A Verifier may obtain data from a Holder device, for example a point-of-sale, and then contact one or more Issuers to validate the data. Other forms of validation may be used, such as by analyzing a blockchain, or the like. For example, data can be signed by an original issuer. The signature can be presented by the user (e.g., holder of the credential) at a point-of-sales point to collect and verify the user's information. The verifier device can receive the data from the Package and check the various issuer signatures for any package referenced to establish a trust level for the various issuers. The Holder device and Verifier device may authenticate to one another before passing data.

System Overview

FIG. 1 is a block diagram illustrating a credential system 100, according an embodiment. The credential system 100 includes a first original issuer 102A and a second original issuer 102B (collectively referred to as 102) that issue core packages 104A, 104B (collectively referred to as 104). The core packages 104 include tags and values that are generated by the original issuers 102. The credential system 100 also includes re-issuers 106A, 106B (collectively referred to as 106) that compile data from one or more issuers (or re-issuers) in the credential system 100 and re-issues an aggregated credential with reference to one or more packages.

A re-issuer 106 may request specific data from an issuer 102, to populate a tag/value pair. The request may include a minimum assurance level. Specifying a minimum assurance level rather than specifying a particular issuer 102, may result in a wider choice of issuers 102 to reference the data from—those issuers 102 who may have data with an adequate level of assurance. Instead of a minimum, as an alternative, the request may specify an assurance level. In some examples, the re-issuer 106 may check the value and in some other cases the values do not matter and only the minimum assurance level or issuer is sufficient. For example, it may not matter if the name of the person is John or Patrick if the name is from a trusted identity. The re-issuer 106 may issue a package with references to data elements whose value has never been received. To verify the aggregate package, the verifier requests the tag(s) and then receives the response. The response delivers the data elements matching the requested tags and when required the references are resolved. In some cases, the verifier may have to resolve the reference and fetch the referred data online.

A data element or a package may be issued with assurance level(s). Such assurance level(s) may be useful in different ways. A data issuer may inherit some assurance levels when referencing data elements from another issuer. Such assurance level may be obtained when acquiring such information during a preliminary verification. In some examples, the request may also specify a minimum level of assurance required for the requested data elements. Specifying a minimum assurance level rather than specifying a particular document type or issuer allows to widen the request for any kind of documents and issuers matching the target confidence level, e.g. specifying a minimum level in a verifier request to include all government issued identity documents (domestic identity, driving license or passport (Digital Travel Credential or DTC)) and no other which may share the same the data elements identifiers but with a lower assurance level.

The re-issuer 106 may also add its own data to the aggregate credential by issuing its own package and consolidating the package with data from packages of other issuers. The re-issuer 106 may sign its own package, portions of its own package, or the aggregated credential.

When preparing a package that contains data from one or more other packages, the re-issuer 106 may check the referenced data. The re-issuer 106 may verify the referenced data by interfacing with the original issuer 102, checking parameters (e.g., data validity/expiration), reviewing a blockchain, or the like. In some examples, the original issuer is not involved in the verification, but rather the re-issuer checks the signature to determine whether it is from a trusted authority.

In the example illustrated in FIG. 1, the first original issuer 102A is a government agency that issues birth certificates (e.g., a Public Health Office of a county). The first original issuer 102A is the place where the user's name, date of birth (DOB), and place of birth are first recorded. The second original issuer 102B is a vehicle manufacturer that produces vehicles. Each vehicle produced is uniquely identified with a vehicle identification number (VIN). The second original issuer 102B creates a package with data describing a vehicle.

The re-issuer 106A may be a government agency that produces packages for vehicle titles (e.g., a Department of Motor Vehicles (DMV)). The vehicle title is identified with a title identifier that uniquely identifies the title. Consequently, the aggregate credential produced by the re-issuer 106A may include: the vehicle title identifier, as issued by the re-issuer 106A; a reference to a package from first original issuer 102A describing an owner's personal information; and possibly a reference to a second package from the second original issuer 102B describing the vehicle. Each of the references to the first package and the second package may include a reference to a specific data element of the first or second package, instead of a general reference to the entire package.

A reference may be stored in the aggregated credential that points to data from another package. The reference may be a Uniform Resource Identifier (URI) or Uniform Resource Locator (URL). When data is duplicated in the credential, the assurance level may be decreased to reflect the possibility that re-issuer 106 may not be authoritative for that data elements and/or that the value may no longer be correct. If data is referenced instead of duplicated, then some of the assurance levels such as related to identity and authenticity may remain at the same level as that in the referenced package. The referenced data is updated dynamically at the source data issuer, so it is likely accurate and up to date.

The re-issuer 106B may be an insurance company that provides motor vehicle insurance. The re-issuer 106B may produce a policy number that identifies an insurance policy for the vehicle. The package that includes the policy number may also include, using actual values or references to the actual value, information about the insured party (e.g., data from package created by issuer 102A), information about the vehicle being insured (e.g., data from package created by issuer 102B), and information about the vehicle title (e.g., data from aggregate credential produced by re-issuers 106A).

A credential database 108 may be used to store packages and other data from one or more issuers 102 or re-issuers 106. The credential database 108 may use a relational database management system (RDBMS) to organize the package information into tables, may be organized as a NoSQL data store, a filesystem, or other configuration to hold and find packages. The credential database 108 may be queried by various entities or users, such as a re-issuer 106, a verifier 110, or a user at a user device 112. A re-issuer 106 may query the credential database 108 to obtain original package information (e.g., information contained within packages or information about packages) to populate an aggregated credential. The credential database 108 may be on the user device 112, a verifier 110, implemented on one or more servers, which may be owned or operated by a credential issuing entity, or other convenient location. In some embodiments, credential issuing entities access the credential database 108 as part of a service.

The various components of the credential system 100 may communicate over one or more networks 114, which may include any known type of network that facilitates machine-to-machine communications. The network 114 may use the same communication protocols or different protocols without departing from the scope of the present disclosure. The network 114 may include wired or wireless communication technologies. The Internet is an example of a communication network that constitutes an Internet Protocol (IP) network consisting of many computers, computing networks, and other communication devices located all over the world, which are connected through many telephone systems and other means. Other examples of communication networks include, without limitation, a Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over Internet Protocol (VoIP) network, a cellular network, and any other type of packet-switched or circuit-switched network known in the art. In addition, it can be appreciated that the communication network 114 need not be limited to any one network type, and instead may be comprised of several different networks or network types. Moreover, the network 114 may include a number of different communication media such as coaxial cable, copper cable/wire, fiber-optic cable, antennas for transmitting/receiving wireless messages, and combinations thereof.

The user device 112 and verifier device 110 may be of any type of compute device. The user device 112 is typically portable in nature, and may take the form of a cellular phone, mobile device, personal device, smart phone, personal digital assistant, laptop, tablet, wearable device, portable credential card, key fob, or the like. It should be appreciated that the verifier device 110 does not necessarily have to correspond to a mobile device, but rather may correspond to a personal computer, desktop computer, kiosk, payment terminal, or the like.

During a transaction, a user with the user device 112 may be asked to present a credentials to a verifier device 110. The verifier device 110 may be a point-of-sale terminal with a beacon. The beacon broadcast may be used to periodically attempt to connect with user devices 112 in communication range or within some threshold proximity. In some examples, the beacon broadcast can be used to wake an application subscribed to changes in the information. The verifier device 110 may connect with the user device 112 over wired or wireless communications (e.g., BLUETOOTH® or WI-FI), and obtain some or all of a credential from the user device 112. For instance, as the user approaches the checkout lane, the beacon (e.g., two-way Bluetooth Low Energy (BLE) device or the like) may advertise a connection, which the user device 112 uses to connect with the beacon and construct a secure connection. The beacon may request certain information, such as a user's name and credit card number, and the user device 112 may respond with the information. The user may selectively share data elements from one or more packages to the verifier device 110 to maintain as much personal privacy as possible. In some examples, the verifier device 110 may validate the credential by accessing an issuer 102, re-issuer 106, or credential database 108. In some examples, the verifier device 110 does not access the issuer 102, the re-issuer 106, or the credential database 108 (e.g., unless it is local to the verifier device 110), but rather performs the verification by checking the issuer signature and confirming that the issuer is trusted.

Package Data Structure

Figure 2:
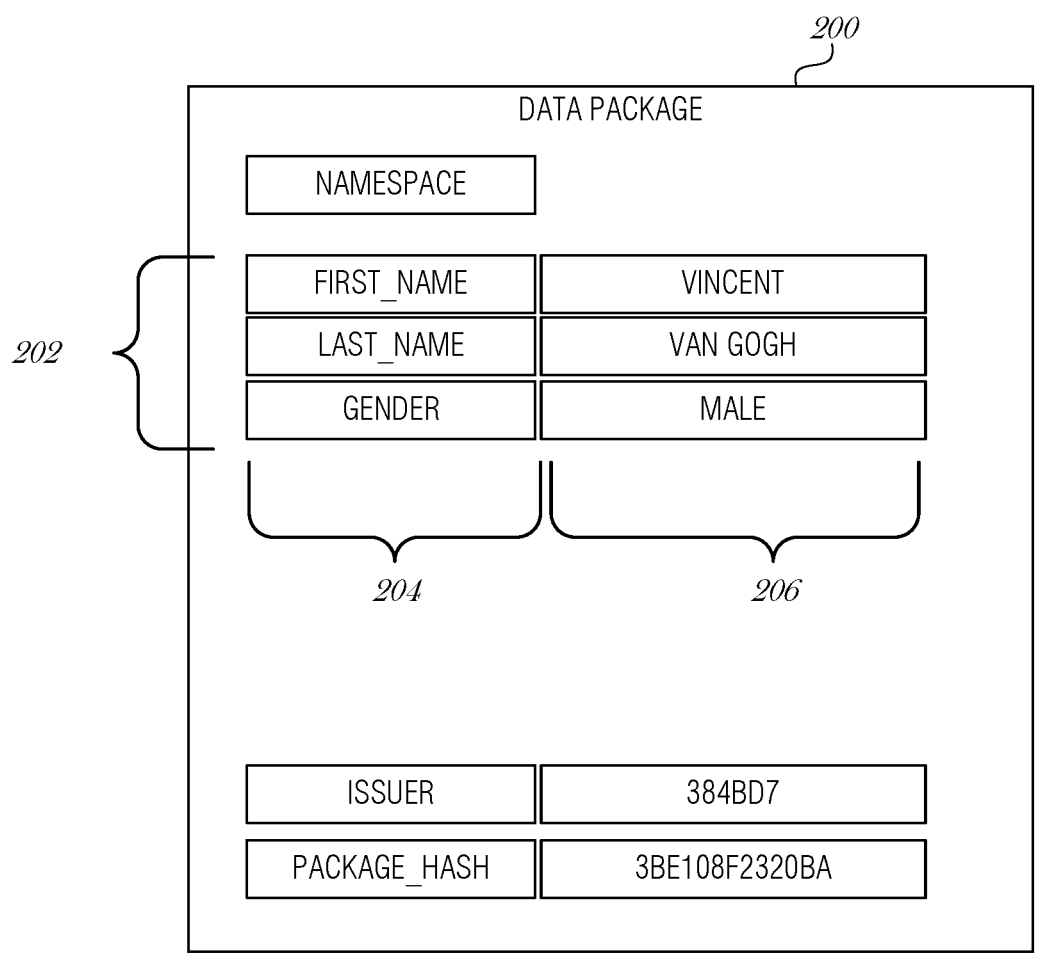
FIG. 2 illustrates a data structure and naming conventions of a data element, according to an embodiment.
Figure 3A:
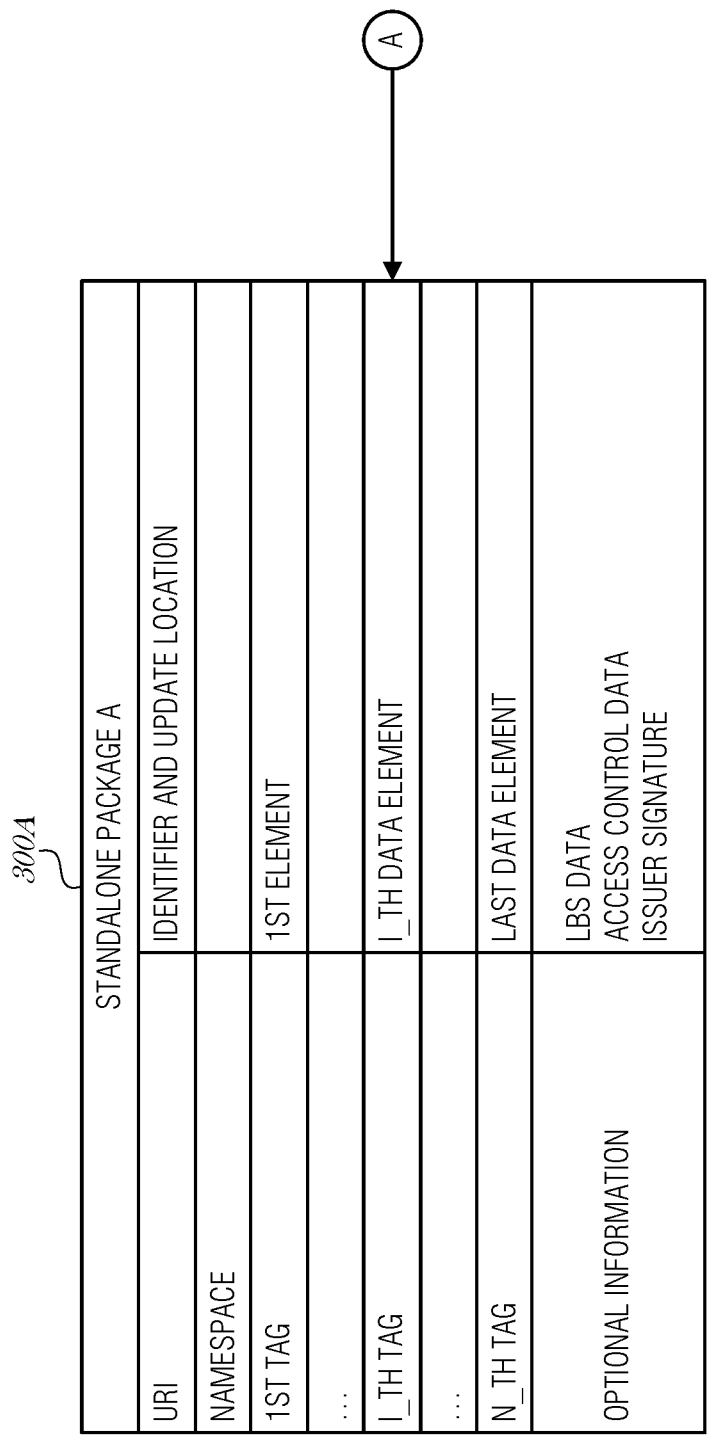
FIGS. 3A-3D is a diagram illustrating package data structures, according to an embodiment.
Figure 3B:
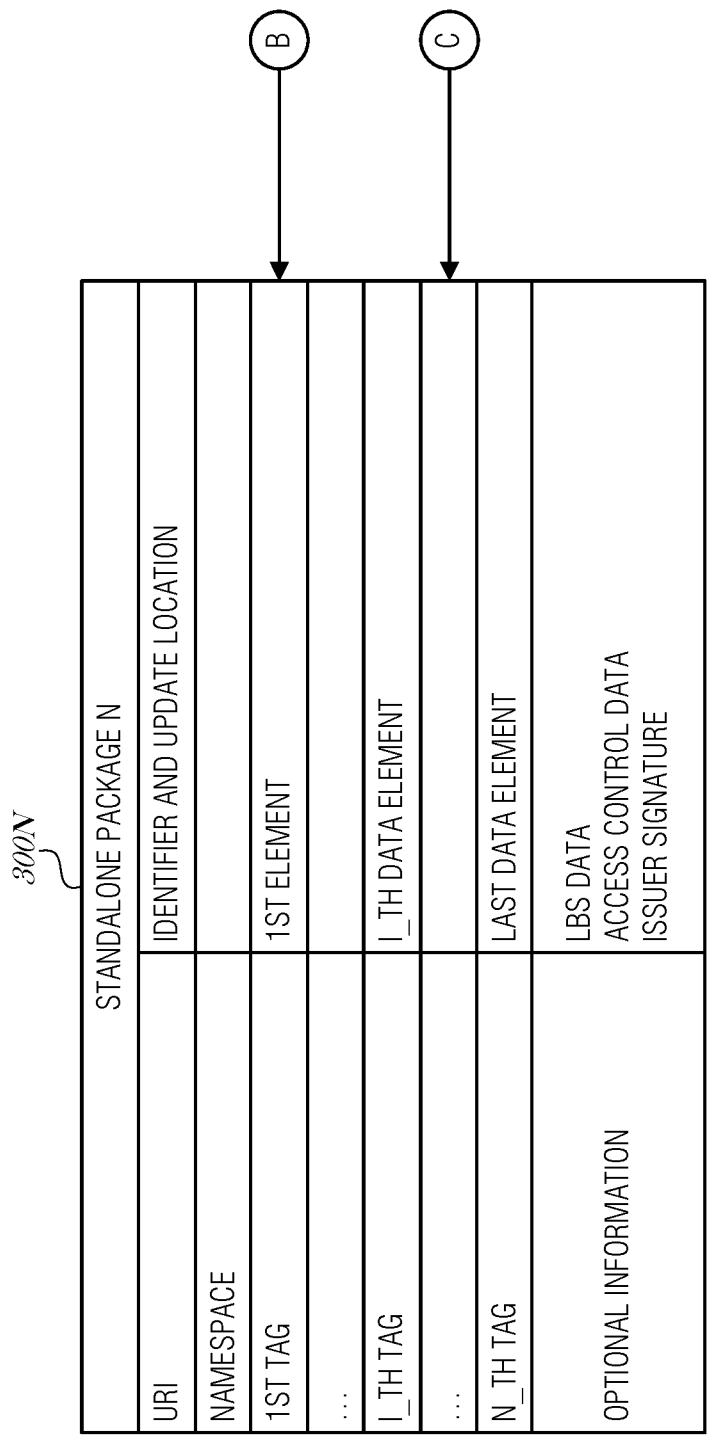
Figure 3C:
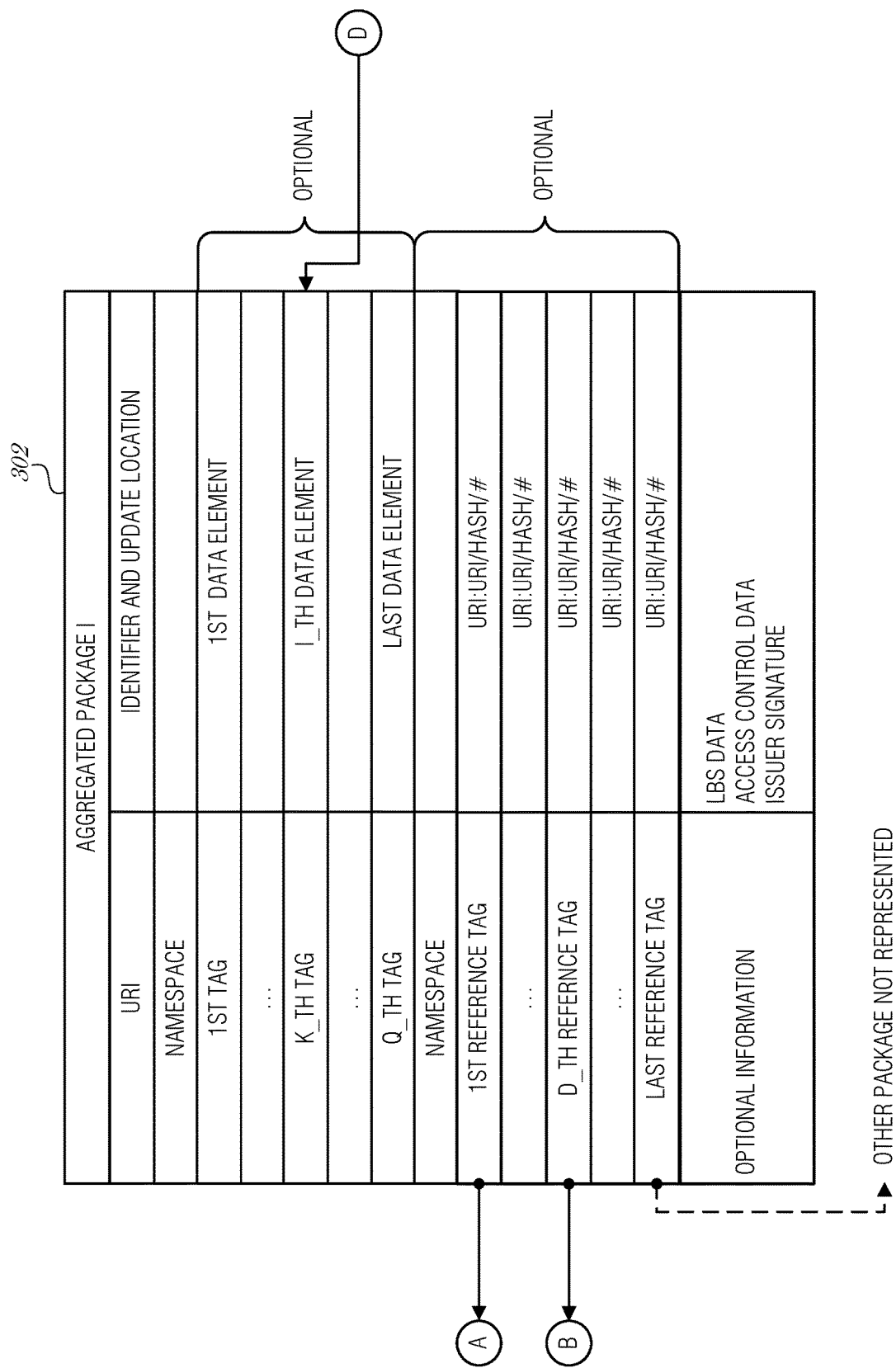
Figure 3D:
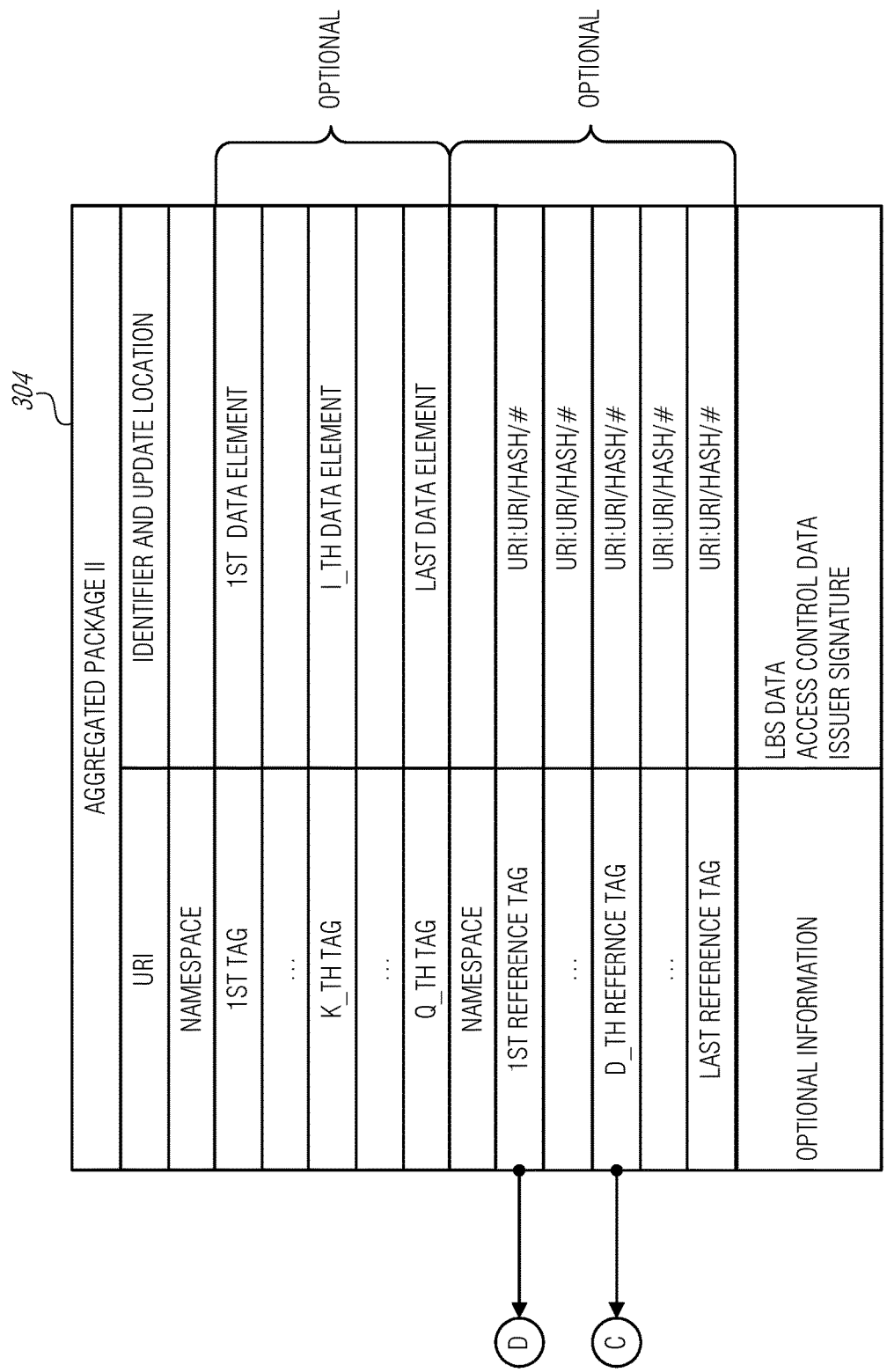

FIG. 2 illustrates a data structure and naming conventions of a data package 200, according to an embodiment. The data package 200 includes several data elements 202, each identified with a "tag." The tag 204 may also be referred to as a field name, attribute name, or a name. The data elements of FIG. 2 include a tag of "first_name" and is used to store the first name of the user. Additional tags of "last_name" and "gender" are included in the example shown. Tags may be formatted using various conventions, such as with underlines, colons, dashes, or other characters to separate namespaces and tags. In addition to a tag, a data element may be associated with a position in the package. This position may be referred to as an index value. This allows reference to a specific data element when the same tag is present multiple times in a package.

A namespace defines the meaning of the tag to make sure such meaning is the same for all issuers thus allowing the verifier to request something specific. The namespace may be at the package level as is illustrated in FIG. 2. As an alternative, the namespace may be at the data element level. For instance, a namespace of "personal_info" may be used for the tags "first_name" and "last_name" and be labeled as "personal_info:first_name" and "personal_info:last_name." It is understood that the naming convention here for namespaces and tags is merely for illustration and that other naming conventions may be used.

Each tag has an associated value 206. The value may also be referred to an attribute or value field. The value for the "first_name" tag is "Vincent." Additional values for other tags are illustrated as examples. Values may be of any data type including, but not limited to numerals, character strings, alphanumeric strings, floats, longs, or the like. Values may be constrained using maximum length, minimum length, maximum value, minimum value, or the like.

Additional tags may be used to capture attributes associated with a tag. For instance, the "first name label" tag is an attribute of the "first name" tag, and has a value "FIRST NAME." The "first name label" attribute tag may be used by an application to generate a user interface with the provided value. The details of this data structure are largely left to implementation preferences.

Additional tags may be used to capture the datatype of a tag. For instance, the "date of birth" tag may have an associated datatype tag of "date of birth datatype" with a value of "DATE." This datatype tag may be used by a user interface to display the value of the "date of birth" tag with appropriate formatting. Other types of datatypes may indicate the MIME type, mathematical precision, image size, or other constraint on the formatting of the associated tag.

Tag may have values with literal values or referenced values. A literal value is a string or other value that is stored in the value field as an actual value. For instance, a literal value of the tag "first_name" may be "Sarah." In contrast, a referenced value is a string or other value that refers to another location where the value of the value field is stored. For instance, a referenced value of the tag "last_name" may be contained in the package located at c'www.issuer_a.id/Ab35H/38FE", which refers to a package "Ab35H" with hash "38FE" and includes the value of the "last_name" tag. Another URI may be used that points directly to the "last_name" attribute, such as "www.issuer_a.id/Ab35H/38FE/3," where '3' is the position or index of the attribute being referenced. Discussion of package names, hashes, and how they are accessed is discussed further below.

As such, a simple package includes zero or more tag/value pairs (e.g., data elements), where each tag is associated with a namespace. A simple package may be empty, so it may have no tag/value pairs. After being instantiated the simple package may be populated with one or more tag/value pairs, as is discussed further below. The tags in a simple package may refer to another tag in the same package or a tag from a different package. Tags stored in a package may refer to data elements from the same namespace or from different namespaces. Further, there may be multiple of the same type of tags in a given package.

A simple package also optionally includes several pieces of metadata that describe the package. This metadata is stored in the package as tag/value pairs. Examples of metadata may include package issuer, issuer electronic signature, package hash value, access control data, location-based services data, expiration date, version number, or the like.

An aggregated package includes one or more references to data from at least one other package. An aggregated package may also include metadata such as the package issuer, issuer electronic signature, package hash value, access control data, location-based services data, expiration date, version number, or the like. An aggregated package may reference one or more data elements of another aggregated package. Aggregated packages may be stored at the credential database 108 or at a re-issuer 106.

An aggregated package is used by an application executing on a mobile device (e.g., user device 112). The application can access the aggregate package and retrieve information from the aggregate package to share with a verifier (e.g., verifier device 110) or to present to the user. In some examples, an application presents information to another as selected by an end user. In some examples, the application receives a request and responds with the information. Additional functionality of applications is discussed further below.

FIGS. 3A-3D are a diagram illustrating package data structures, according to an embodiment. Standalone packages 300A and 300N may have some or all of their data referenced in one or more aggregated packages, such as aggregated package 1 302 and aggregated package 2 304. Each package 300A-N and aggregated package 302, 304, may be network-accessible using a URI.

To reference data elements from a package, the URI of the package may be expanded with a reference of the data element, its position in the package, and a hash of the data element or the package the data element belongs to. Keeping track of the hash allows the requester to detect if a package or data element has changed.

As discussed above, the tag may be associated with a value that is either an actual value or a reference to the data element associated with the value. Tags may also be associated with other attributes, such as labels and datatypes, which may be used in a user interface to format or configure presentation.

When a value is referenced with a URI, the URI may have the following format: [issuer URL]/[package ID]/[package hash]/[tag ID]. The download URL may be a network URI that uses the HTTP protocol. The package ID may be a unique identifier for the package. The tag ID may be an index into the package, a unique identifier for the tag, the tag name, or some other indicia of the tag in the package. Using a URI provides a simple way for all necessary entities to access the package and the referenced data within.

An example of a standalone package 300 is a government citizen identity. Another example is a vehicle registration.

An aggregated package 302, 304 may be anything that references a data element (e.g., name, access rights, a receipt from a sale, etc.) in another package, such as a driving license, health coverage, flight ticket, etc. An aggregated package may also be used for things like payment credentials, which allows a verifier to check a buyer's identity or age information in the same transaction as payment, access control data so that biometrics of the person identity may be verified during access control, etc.

In some cases, the aggregated credential is not for specific data elements but for a document. In this case, a new credential may be bound to an issued document. For example, a document may be bound to access control credentials so that aggregated credentials may be rendered obsolete when the package it is aggregated to changes or expires. Further the referencing method may be similar to the one for a data element, but the URI is shortened to only reference the package. For example, the URI may be in the form of: [issuer URL]/[package ID]/[package hash]. The enforcement is then handled by the application itself and could rely on policies delivered along with the package.

Figure 4:
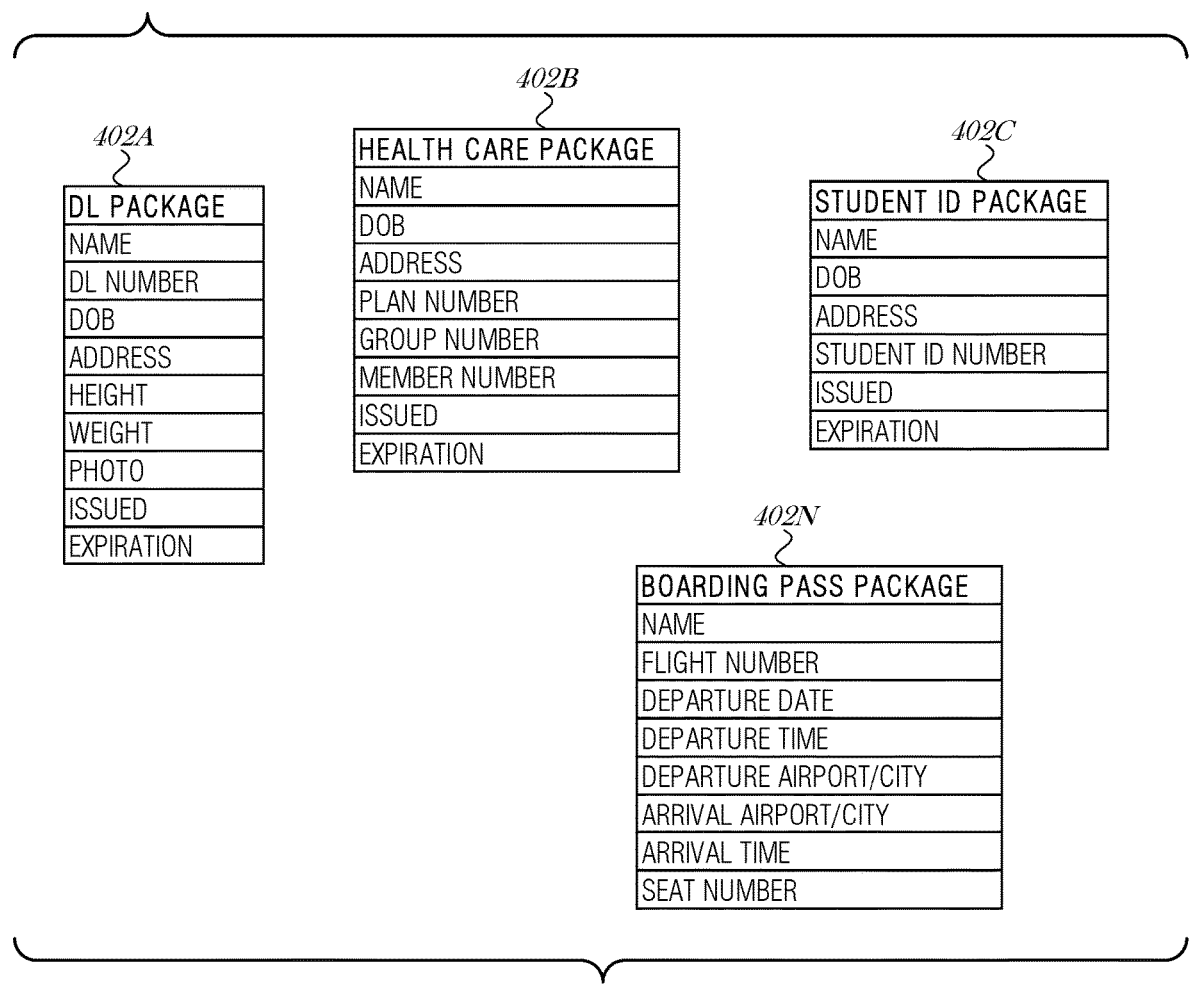
FIG. 4 is an example aggregated data structure used to store data from various issuers, according to an embodiment.

FIG. 4 is an example aggregated data structure 400 used to store data from various issuers, according to an embodiment. The aggregated data structure 400 may comprise any data structure suitable for storing data and issuing data in accordance with at least some embodiments of the present disclosure. As illustrated, the data element references in the data structure 400 have the following correspondence to the packages 402: "DL" is the DL package; "SID" is the student-ID package; and "HC" is the health care package.

The aggregated data structure 400 may compile data packages 402A-N from various issuers. In some examples, the packages can be organized by namespace. Examples of issuers include, but are not limited to, governmental entities, healthcare providers, educational entities, travel services, financial institutions, utility providers (e.g., cable, electric, cell phone providers, etc.). In this example, data package 402A comprises driver's license data received from the DMV, healthcare package 402B comprises coverage information received from a healthcare insurer, student ID package 402C is received from an educational entity, and boarding pass package 402N is received from an airline.

The driver's license package 402A includes the data tags: name, driver's license number, date of birth, address, height, weight, photo, issued data, and expiration date. The healthcare package 402B includes the data tags: name, date of birth, address, plan number, group number, member number, issued date, and expiration date. The student ID package 402C includes the data tags: name, date of birth, address, student ID number, issued date, and expiration date. The boarding pass package 402N includes the data tags: name, flight number, departure date, departure time, departure city, arrival airport/city, arrival time, and seat number.

As shown, all packages 402A-N include the data tag "name." Data packages 402 A-C include the "date of birth (DOB)" tag. Therefore, if a new issuer wants to reference the "name" or "DOB" data tag, there is a choice of issuers. The referenced data may be chosen based on factors such as required assurance level, associated cost, verification status, expiration date, etc. Although, not shown, each data package 402A-N may include a unique identifier. Data packages 402A-N are for illustration only, and it is understood that in some implementations, packages 402A-N may include additional data tags, fewer data tags, different data tags, or differently arranged data tags than those that are shown in FIG. 4.

In some embodiments, a data package may include, or reference a given data tag multiple times. For example, the identical tag may come from different people associated with the same package, such as all individuals covered under the same car insurance policy. Therefore, the data tag and corresponding value for the policy number may be identical across all individuals covered under the same policy. In another example, the same data value may be used multiple times in the same package. For example, the insurance package 402B may indicate a primary member of the insurance package 402B and covered member(s), where the individual listed as the primary member may also be listed under covered member(s).

Package Issuance

In general, a package is issued at the request of an application that is executing on the user's user device. The user may initiate the request of an electronic credential though the use of an application. The application may be associated with a service, entity, or other platform.

Depending on the type of issuer (e.g., original issuer or re-issuer), the package obtained by the user at the user device may be a standalone package or an aggregated package. Before an aggregated package may be issued, at least one standalone package is issued. Then the aggregated package may refer to one or more data elements from the standalone package(s) and include references to the values of the standalone package(s) in the aggregated package. An aggregated package may also refer to data element(s) from other aggregated package(s) and in some cases may not refer to any data element from a standalone package.

Issuing a standalone package typically involves a single issuer. An issuer may be provided with the necessary information to issue packages to an application, whether directly to the application or through some application backend.

The package may be issued to the application in several ways. The actual mechanism depends in part on the desired user experience. For example, if the request is performed from within the target application, then it is easy to collect the details of the application. However, when the trigger is received by the target user, independent from the target application (e.g., some information that triggers the acquisition is provided to the target application such as an email with a magiclink or deeplink to the application with the provisioning information), then the optional identification process starts only after the acquisition trigger is received. There are also cases where the target application is known but the instance is not.

Through various mechanisms, at some point the selected application from the user initiates the acquisition. Here again various cases may apply and more particularly the package may be delivered through the application backend (e.g., stored at a network location accessible by the application) or directly from the issuer to the application (e.g., stored locally in memory accessible by the application). While acquiring through the application backend is typical, the case where the application acquires directly from the issuer presents some challenges such as connecting securely to a legitimate server.

In addition, there is value in making sure the application connects only to a legitimate address without the need to update the application for each new authorized issuer. In that case, the address to acquire a package from an issuer may include some digital signature or equivalent (e.g., message authentication code (MAC), crypto checksum, etc.). As such, the URI provided to the application, which has all the information to acquire a package, also embeds a digital signature that the application may use to verify and connect accordingly for starting the package acquisition. Typically, the URI includes a signature from a trusted authority known to the application. For example, in a preliminary step the issuer receives general information about the application including proper information to sign the URI for the application to initiate downloading.

Example of an issuer URI: [Issuer_Address]/[Package ID]/[Package Hash]/[Issuer Certificate].

The issuer certificate may be as short as the signed public key with a reference to the trusted authority. It is worth noting that the URI delivered by the issuer contains more information than the URI used to acquire a package. Therefore, there is no problem with the typical 2083 character limit or some web services. The URI received by the application may contain much more information that does not have to be passed to the server side, such as:

(1) The signature and issuer certificate that are simply used for the application to verify that the received information is legitimate.

(2) The package identifier, which may be used in the payload of the HTTP request method used to acquire the package (e.g., the body of GET, PUT, POST, etc.).

(3) Additional security that may be put in place to ensure that only the target application is able to acquire the content. For example, secure delivery methods (e.g., secure channel to the application, separate channel to the end user, etc.) may be used for the URL. Additional authentication or identification information may be exchanged during application discovery and used to ensure the package is only opened by the target application instance. Additional steps may also be put in place to confirm the user is authenticated, for example by using additional one-time code or other biometrics verification.

Finally, at the end of this process, the standalone package has been acquired. The issuer may have information to notify the application about package updates and the application may check for updates using information from the URI following a notification. Alternatively, the application may periodically (e.g. as per some schedule for the package) or regularly poll the issuer to determine whether any updates have occurred.

The URI of the package may be recorded by the application for later use. The URI to record or complementary information may also be delivered along with the package. The URI may be signed along with the package data to ensure its integrity (and as such may be part of the package metadata), authenticity, and relevance to the package itself.

A package may be delivered along with additional information to support the user experience:

(1) Information dedicated to the application UI such as:
   (a) a label in end user language for each data element in a package.
   (b) a friendly name for the package, e.g., "Driving rights."
   (c) a data type to help the user interface to properly display the information, e.g., string, date, URL, picture and other mime type, etc.
(2) Information for the UI for a verification:
   (a) Naming a group of tags (not limited to the one from the delivered package) to simplify the presentation of the request where this name can be used as a purpose or as a means to replace the group of tags instead of only showing the list of requested tags. Multiple groups of requested tags may share the same purpose. Having that information delivered by the issuer increases the trust level compared to receiving this in the request. It is also more convenient than having it delivered as part of the application code.
(3) Information for related enrollment:
   (a) For example, a package may have references or information related to enrollment forms for additional credentials, aggregated or not. Such information may provide a mechanism to enroll for additional packages from within the application. The information may be delivered as a URI that contains the name of the package to enroll and a URI to the enroll site.

The use of the URI for these various features is also applicable to aggregated packages.

In the particular case of issuing aggregated credentials, the issuance process may vary because of referenced data elements. In particular, the issuance target may be the same as the reference data and therefore the process may take place without any further action from the user. More details are provided below.

One preliminary step may be to check if needed data elements are already issued and are valid to be referenced. In some embodiments, there is no need to access the value of such data elements and only the references are necessary. This provides tremendous benefits regarding protecting personally identifying information (PII). Validity may simply mean issued by an adequate issuer. Checking if the needed data elements are already issued may be done either from within the application (e.g., when completing a form within the application) or a preliminary issuance step, which may involve the verification process or part of it. During that process an issuer may request for already issued data element(s) quite similarly to a request for verification. Already issued data elements may be delivered accordingly or authorization to fetch from online or a combination thereof.

In some embodiments, the request may be for references to data elements instead of the actual values of the data elements. This may be enabled by using specific tags for the references or having a parameter in the request to mean the list requested tag is to receive the references and not the actual value.

Information about the package containing the data element is also provided, including for example the URI of the package. After confirmation that a data element is valid to be referenced, the URI of the package may also be used as part of its referencing method as indicated above.

In some embodiments, it is only necessary to receive the information to reference the data element and not the data element itself. For instance, knowledge that such data exists from the adequate issuer is sufficient to be referenced. This may be the case, for example, when enrolling from the application itself where the application is able to perform the necessary checks to ensure valid data elements are present.

For data element missing from the response, the issuer may choose to enroll the end user for the missing data. In that case the issuer may use its own assurance level which might be lower than referencing from proper user. Alternatively, the issuer may direct the end user to enroll with an adequate issuer for such missing data.

Another difference with a standalone package is that an aggregated package would typically be made available to the same application whose data elements would be referenced. Therefore, as the target application is typically known in advance, the issuance process of an aggregated package may be that the aggregated package is delivered or acquired automatically—without any specific user intervention in the acquisition process.

When an aggregated package is delivered or acquired automatically, the user may be informed about the upcoming package and asked for consent before the package is prepared and not during the acquisition process. The user may also be requested to confirm that they are an authorized and correct user before acquisition begins. In some cases, the user may receive the package and then opt to delete it if not interested.

In some embodiments, the issuer of the aggregated package is provided with the necessary information to notify the source application or its gateway, which then triggers the acquisition of a package. The notification information may be delivered along the verification process, for example, using an additional command, a special tag to request such information as part of the request for verification command, or using similar application discovery as for standalone packages. In the case of using a special tag, a verification process may also be used to initiate the issuance of a standalone package. The application may, for example, return that information only to authorized identified verifiers.

Instead of notification, the issuer of the aggregated package may also provide the information to download the aggregated package along the with the verification. For example, the issuer URI is provided along with or after or before the request.

Finally, once the package is ready, the target application or its gateway may be notified, and the aggregated package is acquired without any specific action from the end user to trigger the acquisition. An issuer may have requested to be notified when data element(s) from one of its packages has been referenced. In such case, the package may have additional information to ensure the issuer is notified of such event. In that case, the application uses information from the package URI to notify the issuer. For example, a PUT, GET, etc. command is used to the specified URL and the body contains the package identifier along with information about the referencing issuer, e.g., the referencing package URI.

In some embodiments, the information about packages is kept on the backend (or the cloud) and even re-issuing referenced data to a device would notify the related issuer(s). While various embodiments may exist, one option is the backend to record both the URI of the referenced package and the URI(s) of the referencing issuer(s) so that an application receiving the same package may also receive information about referencing packages and the related issuers could be notified accordingly. Notifying the aggregated issuers can be done from the application or from the backend. The backend can be the application backend or a cloud backend where the user data is saved and can be restored or transferred. In some examples, the backup backend may only have references for all data elements and may not have any value thus not being exposed to PII.

Figure 5:
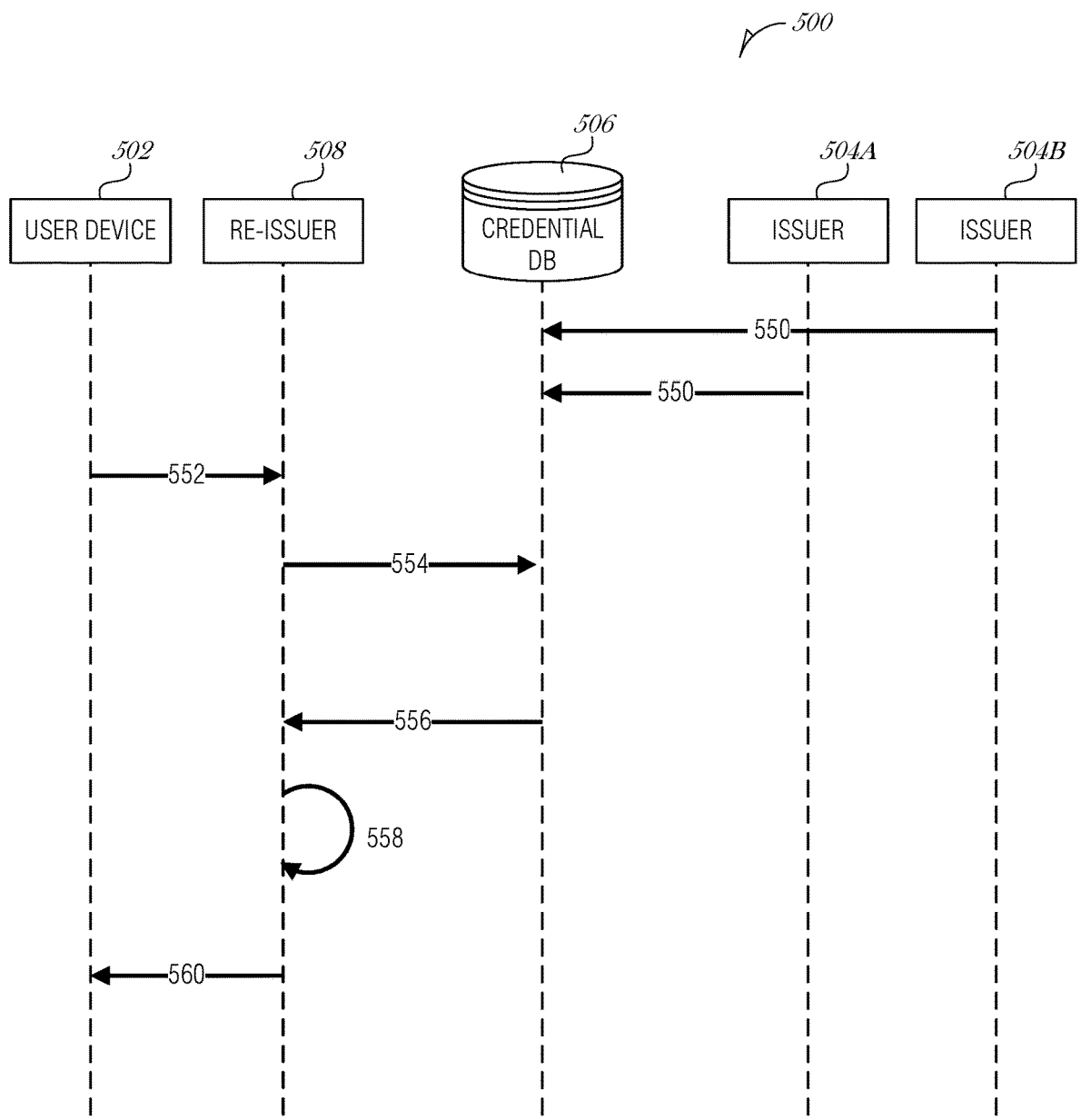
FIG. 5 is a message sequence diagram illustrating electronic credential generation and issuance process, according to an embodiment.

FIG. 5 is a message sequence diagram illustrating electronic credential generation and issuance process 500, according to an embodiment. While the various processes will be described in accordance with illustrative steps performed in a particular order, it should be appreciated that embodiments of the present disclosure are not so limited and that any of the process steps depicted and described herein can be performed in any order or in parallel with one another.

A process is shown where a user requests an electronic credential via the mobile communication device 502 carried by the user. The user may be the person associated with the requested credential.

The process begins with issuers 504A or 504B transferring credential data to an application that may use a database 506 (operation 550). For example, issuer 504A may be a financial institution and issuer 504B may be a governmental entity. In some embodiments, the data may be transferred over a secured communication session established over a communication network (e.g., a secured session using a hypertext transport protocol). The user of the mobile communication device 502 may initiate a request for an electronic credential (operation 552). For example, a person may request an insurance card in electronic format from a health insurance provider. The re-issuer 508, in this example a health insurance provider, requests data from the credential database 506 (operation 554), which may store data from issuers 504A and 504B. In some embodiments, re-issuer 506 may pay a fee in order to access the requested data. Once an appropriate payment has been received, credential database 506 transfers the requested data to re-issuer 508 (operation 556). Alternatively, the verification may be recorded, and payment may take place after. Such requested data could be only the references to needed data elements as long as the issuer meets the re-issuer criteria.

Re-issuer 508 generates the data to be issued (operation 558). In some embodiments, re-issuer 508 initially issues a standalone package that does not contain any referenced data, which may act as a placeholder package. In other embodiments, the issued data includes at least one reference to data from another (one or more) package/issuer. The issuance process to the holder of mobile device 502 of a standalone package is different from issuing a package that contains referenced data because for a package that contains referenced data, the referenced data could be missing if the referenced package is gone and such data must be available at the time of verification. In some embodiments, packages containing referenced data may only be issued to applications where the reference data package is available. The re-issuer 508 issues the data package to mobile device 502 (operation 560).

In some embodiments, data packages may need to be updated. If the data package references data from other issuers, the referenced data may be updated. The re-issuer that referenced the data may desire to be notified of the update and verify the updated data before referencing the data again. For example, the re-issuer may be notified to fetch updated data. In addition, data packages may include information about the version of referenced data. In some embodiments, the re-issuer may not want to be notified as long as the same data tags exist and accept the updated data automatically. Additionally, the referencing data package should be alerted when the referenced data element/tag is removed or no longer present. In some embodiments, delivery of a data package with referenced data may trigger an update process to deliver the referenced package to the same application.

Using URI to identify package and reference data elements also provides additional benefits in regards to re-issuance. One aspect is to inform the issuer whose package data has been referenced and by which issuer(s). Accordingly, the issuer of the referenced package may notify the identified aggregated re-issuers when the same user gets the package reissued or a similar package issued. It also provides a mechanism to notify such re-issuers when similar packages are issued to other users.

Another aspect is for an end user to authorize another user to act on their behalf. For example, this may enable an end user to allow another person to use a pick-up receipt on their behalf. In that case, the package gets aggregated to another user identity. This may be done either by aggregating another identity to the existing one or by replacing the identity by the new one that the verifier checks. That process is initiated by the end user the package has been delivered to and may go through a backend system that re-issue for the new target user.

Another aspect is for an end user to receive a package for another user. For instance, this may be useful when multiple users have tickets from the same booking. In that case, it might be valuable for the user to also receive the information in an aggregated form. The aggregated information comes with the URI to acquire the missing referenced data. In that process authorization for the referenced data may have been delivered to the re-issuer so that the application from another user is able acquire the information. For example, the referenced data application has delivered an authorization for the target end user or its application.

In some embodiments, verification may be implemented as a re-issuance instead of the typical process of responding to a request by tag. In that case the response may look like a package issued by (or on behalf) of the holder application and aggregating information from the various packages whose requested granted data elements belong to.

Package Updates and Deletion

The update process may be similar to issuing aggregated credentials because the target application is known. Updating a package may be triggered by different events, such as notification from an issuer, scheduled updates from the application, user triggered update, etc. The target package is acquired and the previous package with the same URI may be replaced by the new one. In some embodiments, the update process provides the hash of the current package. Then the application verifies that the acquired update comes with the proper hash of the package to update and only replaces the package accordingly. This is of interest in particular to prevent losing data that may have been modified through other mechanisms. For example, for a transactional data element that may be updated by another system and whose information has not reconciled to the issuer backend. This is typical of transit tickets, which are delivered by the issuer and where a turnstile reader may modify the ticket data and the change isn't reported in real time to the issuer or not reported at all.

With aggregated credentials, updating a package may trigger additional events. In particular, when an update may impact other packages because of referenced data elements.

While in some cases, an issuer may have chosen not to be informed as long as the referenced data element still exists, typical issuers may want to be notified when there is an update and the hash of the referenced data has changed or isn't available anymore. They may also want to be informed when there is an update and the hash of a package containing referenced data has changed, or when the package containing the referenced data has been deleted.

In some embodiments, the application notifies the related issuer using information from the URI of impacted package. This is done, for example, by using the HTTPS request method or a GET over TLS or other methods with information about the impacted package. Additional information about the referenced data elements may also be provided for information. A response to that notification may be a verification request for the issuer to analyze the data elements from the updated content.

Further events may also trigger a notification to an issuer. For example, when a package with a tag identical to one of the issuer packages is received or the value has changed, it may be of interest for an issuer to know if an issuer of different (e.g. higher) confidence level has issued information. It may be of interest to a competitor issuer or may be of interest for a re-issuer to re-issue referencing data elements with higher confidence level.

Other information could be delivered along with a package including a digital signature to inform about authenticity and to allow verification of integrity. It is also a means to bind the package information together. The signature typically applies to the package, but other embodiments could rely on signing part of the package such as for example limiting the signature to the data element(s) and reference(s) to data elements.

Additionally, a reference to data element may be associated with the hash of the package. This provides a mechanism to find out if the source package has been modified.

Access control information that may apply to all or specific data element(s) in a package may be delivered with the package. This provides a mechanism to restrict access to specific data such as fingerprint to certain verifiers. Such access control mechanism may rely on a trusted authority where only a verifier whose identification certificate is issued by one of the trusted authorities is able to access the restricted information. Access control may also apply to the whole package.

Location information in the form for example of GPS coordinate(s) to determine a zone or beacon identifier may be delivered with the package. This provides a mechanism to wake up the application when such location condition is met. Typical use cases would be airline tickets or a pick-up receipt where the application is configured to notify the user about a verifier at a relevant time, e.g., when at or near the right gate or at or near the pick-up location.

Additionally, the information may be augmented with a pre-authorization for specific verifiers which would be pre-authorized to acquire specified data without the need for user consent.

Other information that may be included with the package include authorization to re-issue an aggregated package to another user or entity. For example, to transfer a pick-up receipt for another person to collect the good or service.

Additional information may include authorization to transfer the information to another application, e.g., share to another user or share to change application.

Additional information may include an expiration independent from the expiration date of the document. Such expiration may also be enforced by using tokenization.

An issued package may contain no data element or references. This could be used for example to deliver information for the application to register to wake up for specific events, locations or other conditions. Furthermore, temporary packages may be delivered empty except for the friendly name which may indicate a pending update or delivery. The actual name of the package may be updated along the acquisition of an update.

A blockchain may be used to record the relevance of the issuer and confirm the assurance level for data element(s). The relevance of the issuer may be stored in a blockchain along with the list of data elements the issuer is relevant for and may accordingly be associated with a confidence level. Blockchain technology may also be used to store the issuer public key and to record verification transactions and allow for audits.

Figure 6:
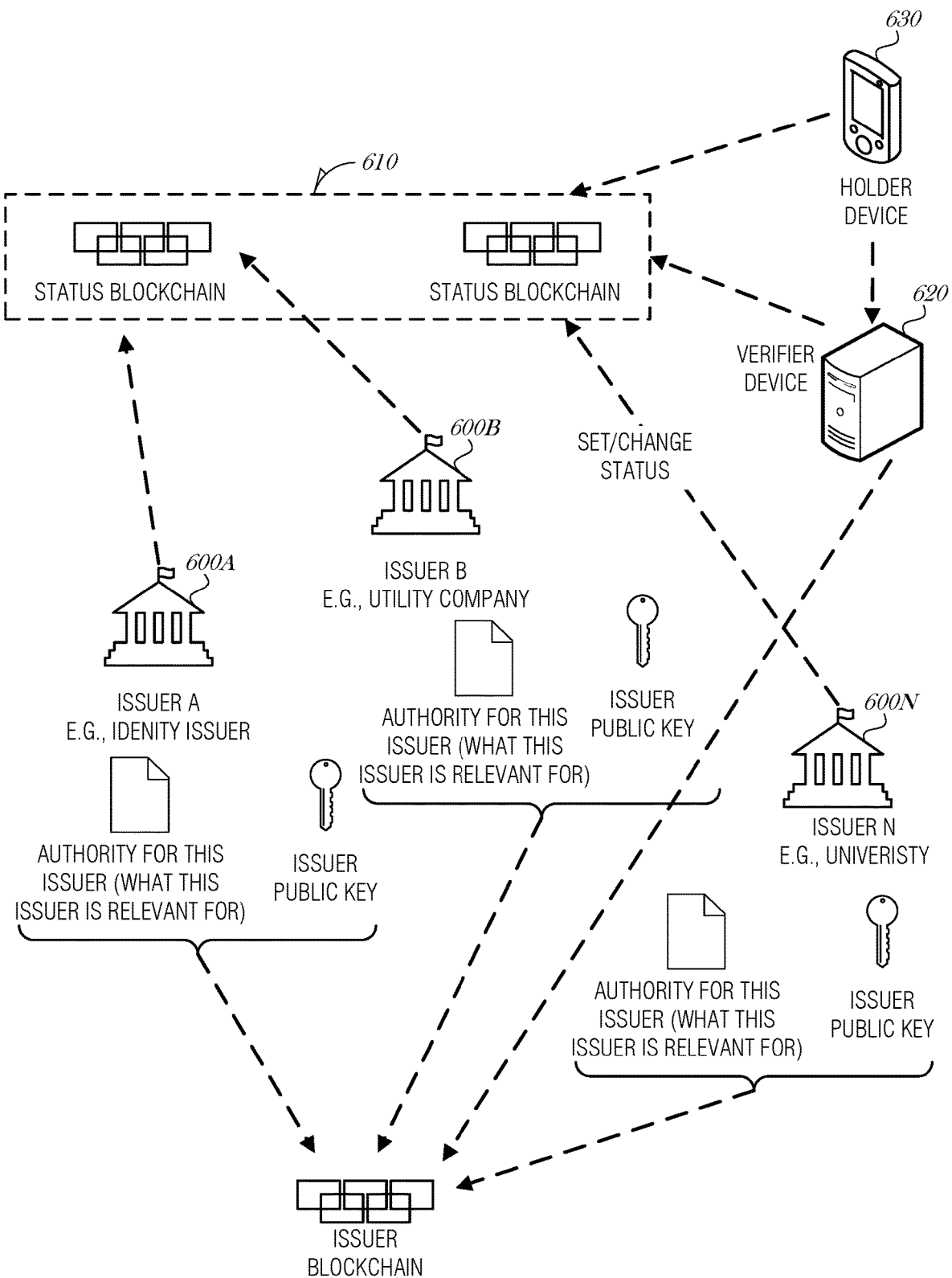
FIG. 6 is a diagram illustrating a blockchain implementation, according to an embodiment.

As illustrated in FIG. 6, issuers 600A, 600B, and 600N may store information indicating the authority for the issuer (e.g., what the issuer is relevant for) and a public key of the issuer in an issuer blockchain. Issuers 600A, 600B, and 600N may update a status blockchain 610 with a status of a data element, a package, or the like. When a verifier device 620 receives information from a holder device 630, which includes data elements or other credential information, the verifier device 620 can verify the issuer signature received from the holder device by cross referencing the issuer blockchain 640. The verifier device 620 is also able to verify the authority of the issuer 600A, 600B, or 600N for the data elements received. The verifier device 620 is also able to verify the status of the package of the data elements received by cross referencing a status blockchain 610. The holder device 630 may change the status of a data element, package, or the like and that change may be reflected in a status blockchain 610.

User Application

The user application executes on the user device and may access one or more issuers or re-issuers. The user application may also access the credential database or other credential service. While various implementations of the user applications exist, they are typically implemented using one or more software components and have the capability to communicate with issuance system(s) and verification system(s).

A user application is capable to receive or acquire packages and may receive updates from one or more issuers. An application may also receive a request for verification containing a list of one or more tags each identifying a unique kind of data element and return a response. An application may have access to the data elements to obtain in the response or may provide an authorization to access such data elements from an issuer or a combination thereof.

User application user interfaces may include features or interfaces to enable Location Based Services (LBS). A user application or interface may optionally feature a notification interface.

A user application may be implemented in various programming languages or platforms, such as with an HTML 5 web page received from an issuer service or native application installed from a typical app store.

User applications may run on a variety of devices such as mobile phones, PCs, tablets, wearable devices, etc. Some implementations may also split the application across multiple devices. For example, the package acquisition agent may be implemented on a mobile phone while the verifier interface is implemented on a wearable device and the user interface may be present on both devices.

Some components of the application may also be implemented in a backend system instead of the user device. User applications may provide interfaces to different systems. Packages received may be stored in or out of the application itself as long as it is available to respond to a request.

Once a package is received, the user application keeps track of the download URL and uses this for checking for package updates. While the application may build the URI to record based on a received download URL and package identifier, a URI may be delivered with the package itself which could serve for several functions. For instance, the URI may provide a unique reference of the package or provide a URL to use for various commands.

The URL may be used to check for updates, e.g., HTTPS GET to download the package or an update. The URL may also be used to check for the status of the package or one of its specific tags or a list of tags, e.g., HTTPs POST token ID to get a status. The URL may also be used to notify an issuer referencing information that an update has been acquired, e.g., HTTPS PUT to the referencing issuer with URI and hash of the referenced data that has changed. Additionally, the URL may be used to inform an issuer when a package has been deleted, for example, with an HTTPS DEL command, which may contain information about the application where the package was provisioned. In addition, the URL may be used to inform an issuer about an aggregation, for example, HTTPS PUT with information about the package with referenced data and the URI of the aggregated package.

The URI may also be used to reference data elements by adding the referenced tag to it and some information to ensure the matching data element is uniquely referenced such as the hash of the value of the referenced data element.

Verifier Operations

Verification is about requesting data element(s) by tag(s), then proceeding with the verification of the values (data elements). Additional information may be added to the verification request such as specifying a document type, a confidence/assurance level, terminal identification, etc.

Typically, the verifier sends a request containing the list of tags and receives a response. The response may include data elements matching some or all of the requested tags. Additional complementary information may also be delivered. The returned data is typically organized by "documents" as this is how the digital signature of the issuer applies. The verifier checks the validity of each document using, for example, an integrity check for the received data elements, authorized issuers, expected type of document, whether it meets a target level of confidence or assurance, etc.

In the case of aggregated credentials, a document may rely on information from different packages which may be from several issuers. As such, while the response format may be similar with packages returned in place of the documents, the part of the verification process where the data elements are verified is slightly different and the UI may showcase the various issuers involved in a single document.

In some cases, the trust is implicit. For instance, if the verifier trusts the issuer of the aggregated package, then the assurance level of the referenced data is ignored and only the integrity is verified. In some other cases, the trust isn't implicit and confidence level may be used as an alternative to ensure that issuers should be trusted.

There is also information that is present on many packages, such as expiration date. In some embodiments, such commonly used information may be returned automatically along with a data element or referenced data element from the same package. In other embodiments, each have a unique tag yet such uniqueness may be built on a generic base for the kind of data and adding specific information related to the package or the kind of package, e.g., base is exp date and exp date DL for expiration date of a driving privilege package thus avoiding creation of an all new set of tags and allowing to reuse existing for the particular kind of package by adding the specific kind of "acronym".

In some embodiments, in addition to the list of tag(s), the request includes a query (e.g., structured query language (SQL)) that aims at improving the user experience by facilitating the selection of data elements from different packages based on criteria defined in such a query. However, as the list of requested tags is provided separately, the SQL request is aimed to convey the expected relationship between the packages the data elements are selected from and a response may be provided even if some data from the SQL result set is missing. For example, the SQL query may be used to specify the expected value of a requested data element. This may be useful to request data elements for a local purpose such as pick up receipt or flight ticket. For example, the SQL query may be used to specify the relationship between different elements such as a car registration whose class of vehicle is matching with the corresponding tag from a driving license and where the card insurance is matching both the vehicle and the driver.

The SQL query may also be used to quantify information not in the data elements such as indicating a minimum level of confidence (assurance) or specify a given issuer.

From a user experience point of view, the SQL query may be used to drive the various steps for a user to select adequate packages for the response. Following the SQL query, packages that are not adequate are filtered out then the filtering process continues following the selection of first data elements or package reducing further the choices based on pre-selection. For example, the SQL query may specify that tags for vehicle category from car registration should match with the vehicle category from a driving license then that car insurance should match both car registration and identity information the driving license is aggregated to.

In some embodiments, the request may be received as different steps where one step is a broadcast which could be generic or targeted and implemented as multiple steps, e.g., beacon to wake up the application (e.g., based on location-based services (LBS) information that has been delivered with a package), then application acquires more details. Another step may follow where the application may notify the user and communicate with the verifier to receive all the remaining details of the request using the same process as for a typical verification. For example, the first step may be for the request to notify a driver of a car by broadcasting the information about the plate number. Then, applications that do not have data matching that plate number information ignore the broadcast, whereas other application(s) may connect to receive the second part of the request and notify the user or connect accordingly for the continuing with the request/response process or just for sending the response.

For these implementations, a first part of the request may contain information for the application to decide if the request should be ignored or not, information about the notification information and about the call for action (e.g. for the button to click). Then, the application may connect to get the second part of the request which may bring the specific tags and relationship information. Alternatively, the application may connect after the call for action. As such, depending on the process, the notification may close, and the process continues on the verifier side. Alternatively, the notification opens the application where the second part of the request may be received and where the user may have more control on what is being shared. For example, the user may provide confirmation with a personal identification number (PIN) or biometrics or view in more details the content of the request or what is going to be returned.

Figure 7:
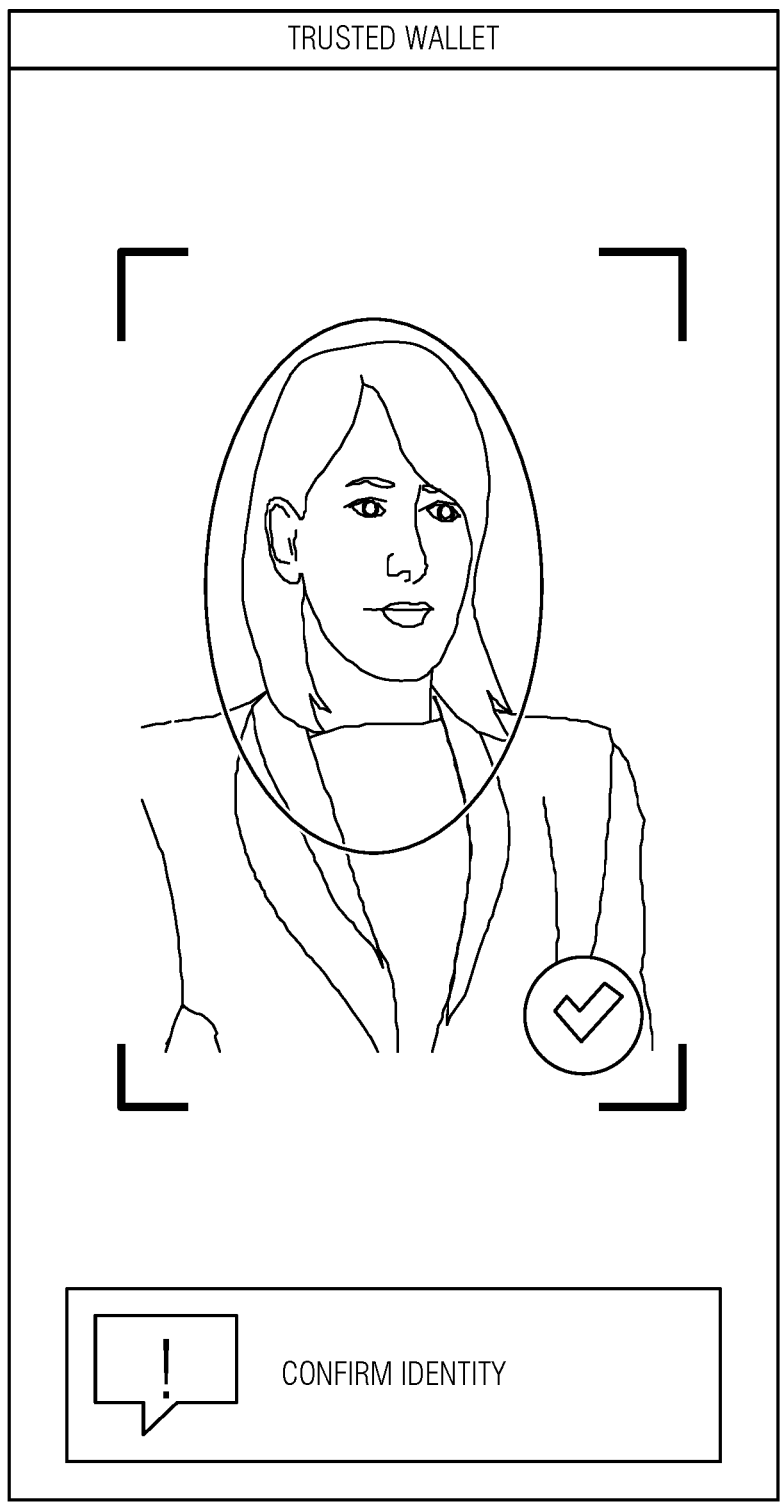
FIGS. 7 and 8 are example user interfaces, according to embodiments.
Figure 8:
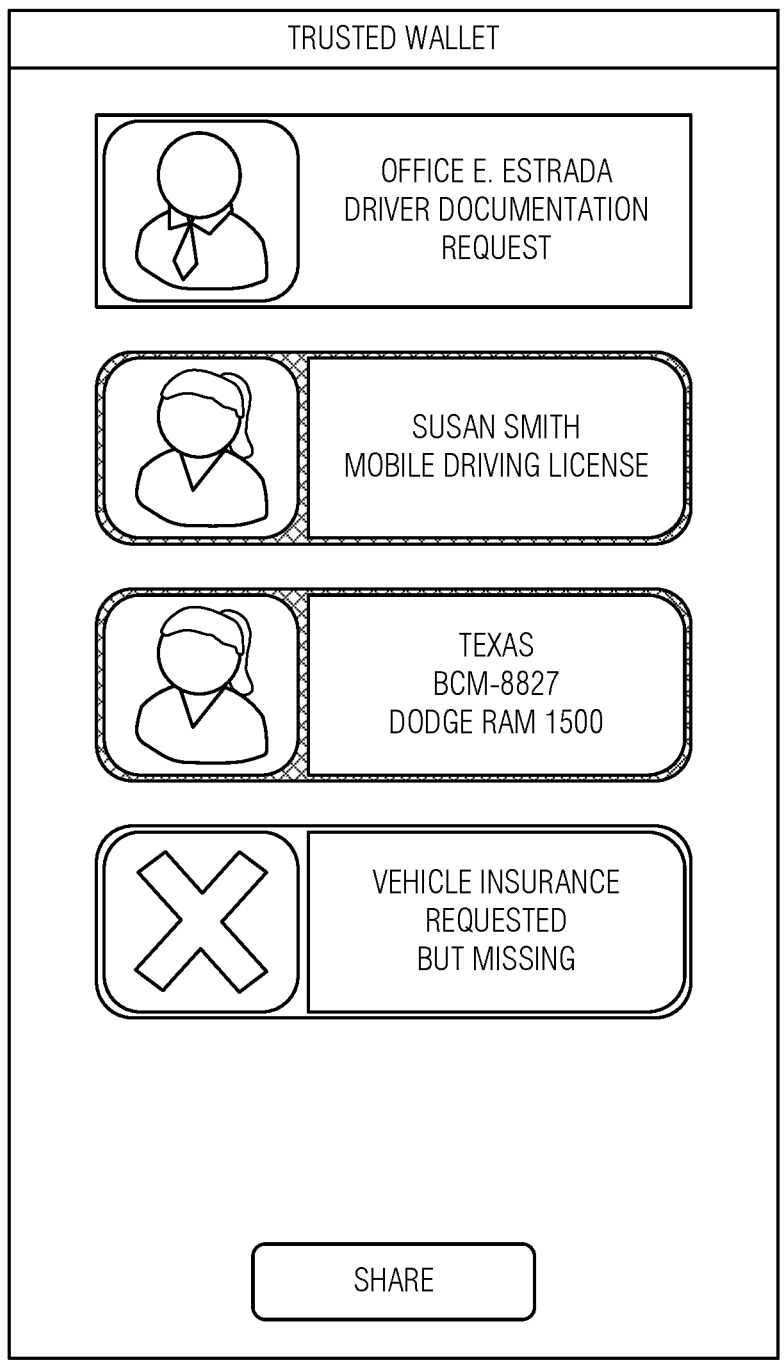

A user interface (FIG. 7) may be presented to prompt the user for access control to the application. Then, the user may provide consent to share specific information based on the information that matches the request (FIG. 8).

Once the data elements have been received and the issuer identified, some or all of the information may be recorded in a blockchain while both the verifier information as well as the end user may remain anonymous. This permits the issuer to verify the number of transactions and claim a revenue share from the cumulated transactions. In that particular case, the information that needs to be reported is the URI of the package whose data element has been verified. There is no need to report the verifier or information about the end user. That being said, in some embodiments where the application checks the blockchain for verification, information about the verifier may be reported as well.

There are also special cases where multiple packages have tags that match partially or entirely to those in the request. All of the partially or fully matched tags may be returned at once. An example use case is for flight tickets. The boarding gate sends a request for particular flight ticket data and the response comes back with data for multiple tickets (e.g. the tickets for the whole family).

Taking advantage of the URI and notification, an end user may be notified every time his or her information is presented to a verifier. The URI associated with the package provides a mechanism for the issuer to be notified and such issuer may use the notification mechanisms to inform the end user through the application. Such process enhances the overall security and provides more confidence in the system.

SQL Query Construct

In further discussion from above, in examples and embodiments described here, a one-click response is made available for the user to present data to the verifier. For the mechanism to work, the data elements need to be selected in the request. Systems and methods are described here that add information in the request that provides a dynamic query to the mobile device to facilitate intelligent data element selection.

Using constructs from relational database theory and structured query language (SQL), the request from the verifier device may be augmented with a query string. The query string may use a previously known database schema to obtain specific data elements in the response.

In an embodiment, a verifier device sends a request for data to a mobile device. The verifier device does not have universal access to the data elements stored on the mobile device, but instead only gets what is returned by the mobile device based on user consent. For instance, the mobile device may prompt the user whether to permit access to one or more data elements stored in one or more credentials on the mobile device. In previous implementations, this may involve several prompts for the user to navigate and permit data elements one at a time. Using an improved request process, the user is relieved of this burden and is prompted once for data access. Hence, a one-click approval process.

ISO/IEC 18013-5 and 23220 allow for request for data elements. In general, an OfflineRequest data structure includes a Version attribute and a DocRequests object. The Version is a string data type that indicates the version of the OfflineRequest. The DocRequests object is a collection of ItemsRequest objects and an optional ReaderAuth attribute. The ReaderAuth attribute is used to authenticate the verifier device in some implementations. The ItemsRequest objects include a DocType attribute and a NameSpaces object. The DocType is a string that describes the document type, the NameSpaces describes the namespace of the data elements requested and the name of each data element requested in the corresponding namespace.

An extension to the OfflineRequest data structure adds an optional attribute, "UI_Query". The UI_Query attribute is a string data type that defines a query string that may be used to select specific, related data elements. These selected data elements are then presented to the user of the mobile device to approve for transfer to the verifier device.

The UI_Query attribute may be formatted like a SQL query using SELECT, JOIN, WHERE, and other clauses conventionally found in SQL syntax. Depending on the complexity of the parser used to process the UI_Query attribute, the underlying database capabilities, and other factors, the UI_Query string may include additional features, such as the ability to use OUTER JOIN, LEFT JOIN, RIGHT JOIN, ON, AS, and other SQL-based functionality. Using the SQL syntax, the UI_Query may specify a relationship between data elements from multiple documents, specify a value for a data element, or specify an order of how to relate documents. It is understood that the examples illustrated here are non-limiting and that alternative query syntax may be used, which may not resemble SQL.

Figure 9:
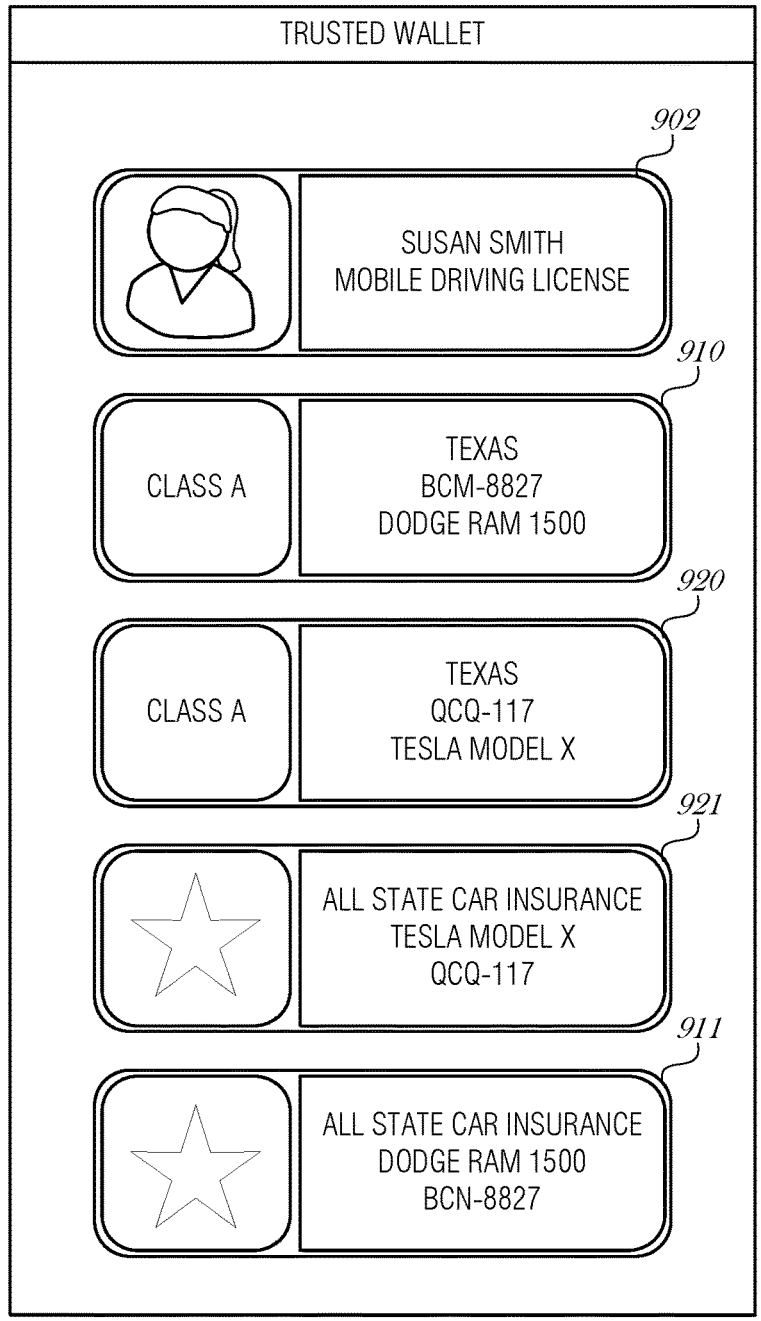
FIG. 9 is a diagram illustrating credential information stored on a mobile device, in accordance with at least some embodiments of the present disclosure.

FIG. 9 is a diagram illustrating credential information stored on a mobile device, in accordance with at least some embodiments of the present disclosure. A wallet application ("app") 900 may be loaded with several documents. In the example illustrated in FIG. 9, the wallet app includes a mobile driving license (mDL) 902, a first vehicle registration 910 for a first vehicle, a second vehicle registration 920 for a second vehicle, a first insurance policy 911 that demonstrates coverage of the first vehicle, and a second insurance policy 921 that demonstrates coverage of the second vehicle.

A verifier device may need access to the mDL 902 and the vehicle registration and insurance information for the vehicle with the plate number "QCQ-117."

Documents may be transformed into one or more tables, which may be stored in a relational database management system (RDMS). Alternatively, the documents may have a structured format such that queries may be performed against the documents as if they were tables in an RDMS. For instance, the documents may be formatted with XML (eXtensible Markup Language) and a query language like XQuery may be used to query one or more XML documents.

Data elements from document types are defined in Namespaces. Documents (credentials) correspond to database tables. Namespaces may include data elements for several kind of documents. As such, the syntax:

{Namespace}.[TableName]. Attribute is used to refer to a data element in a certain document and namespace, and {Namespace}. Attribute is used to refer to a data element in a namespace across any document. As such, documents whose data elements are defined by different namespaces may be handled as managing namespace specific databases. As such SQL like query may still apply. However, because a table reference may be omitted in the case of when the document is not specified, the notation for a namespace should be specific so that the parser is able to determine whether the reference is to a namespace or a table.

Extending this example, for the verifier device to query the wallet app on the mobile device, the UI_Query may resemble:

```
SELECT      *
FROM        {Name_Space_ProofOfOwnership}.[Doc_Vehicle_Registration]
        AS Reg,
            {NameSpace_Any_Identity_Doc}.[Doc_mDL] AS mDL,
            {NameSpace_Insurance}.[Doc_Insurance] AS Ins
WHERE       Reg.DataElement_VIN = Ins.DataElement_VIN AND
            Reg.DataElement_DLNum = mDL.DataElement_DLNum AND
            Reg.DataElement_PlateNum = "QCQ-117"
```

When the query is operating within a single namespace that defines all the data elements, the namespace may be omitted as it is expected to be identical to the one for the requested data elements.

In an alternative embodiment, the ItemsRequest section may be used to specify a target value for a data element in the NameSpaces object. In such an embodiment, the UI_Query may return the full query result set (e.g., a "SELECT *" on multiple documents or tables) and the application operating on the mobile device may filter the full query result set with the ItemsRequest value.

Credentials may be parsed and stored in one or more tables. This preprocessing may be performed when a data request is received or beforehand, such as when the credential is first created or updated. The tables may be normalized into any form usable in a relational database management system. For instance, the tables may be normalized in Boyce-Codd Normal Form (BCNF), First Normal Form, Second Normal Form, Third Normal Form, or other types of normalization schema. Additionally, a single table may be used (e.g., a flat database) where all the data from every document is stored in the single table. It is understood that normalized schema may be transformed into unnormalized form, and vice versa.

Operations

Figure 10:
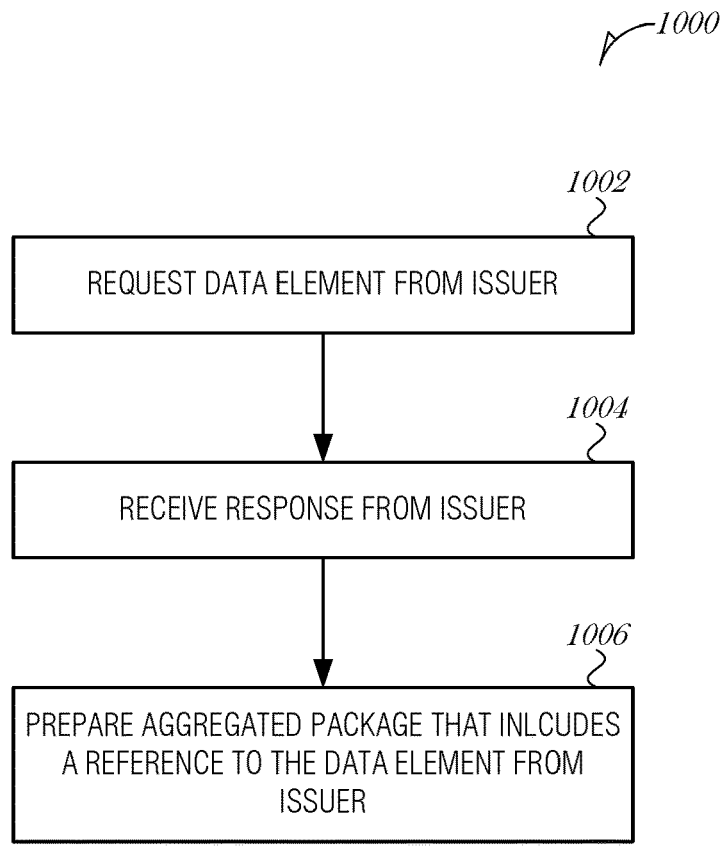
FIG. 10 is a flowchart illustrating a method of providing a data aggregation system, according to an embodiment.

FIG. 10 is a flowchart illustrating a method 1000 of providing a data aggregation system, according to an embodiment. At 1002, a data element is requested from an issuer where the data element is identified with a unique identifier. In an embodiment, requesting the data element comprises requesting a reference to the data element and the response from the issuer includes the uniform resource identifier.

In an embodiment, requesting the data element from the issuer includes requesting data elements having a minimum confidence level.

In an embodiment, the requested data elements are delivered in a source data package and the source data package has a confidence level.

At 1004, a response is received from the issuer. In an embodiment, the response includes a network location of the data element without a value of the data element. In an embodiment, the response includes a network location of the data element and a value of the data element.

At 1006, an aggregated data package is prepared to issue where the data element from the issuer is included by reference with a uniform resource identifier related to the issuer.

In an embodiment, the aggregated data package to issue is assigned a confidence level. In a further embodiment, the method 1000 includes issuing a credential that includes the aggregated data package to issue, where each data package in the credential has a respective confidence level. In an embodiment, a confidence level for the data element from the issuer is inherited from the issuer.

In an embodiment, the uniform resource identifier is a uniform resource locator. In a further embodiment, the uniform resource locator includes an address of the issuer, a source data package identifier, and a source data package hash value. In a further embodiment, the uniform resource locator comprises an index value of the data element that describes a location of the data element in the source data package. In a related embodiment, the method 1000 includes using the source data package hash value to determine whether the data package is current and obtaining a revised data package when the data package is not current.

In an embodiment, the method 1000 includes detecting an update to a source data package containing the data element from the issuer. In response to detecting the update, an updated version of the data element is requested from the issuer. In a further embodiment, the uniform resource identifier includes an address of the issuer, a source data package identifier of the source data package, and a source data package hash value of the source data package. Using this information, the method comprises using the source data package hash value to determine whether the data package is current and initiating the request for the updated version of the data element when the data package is not current.

Figure 11:
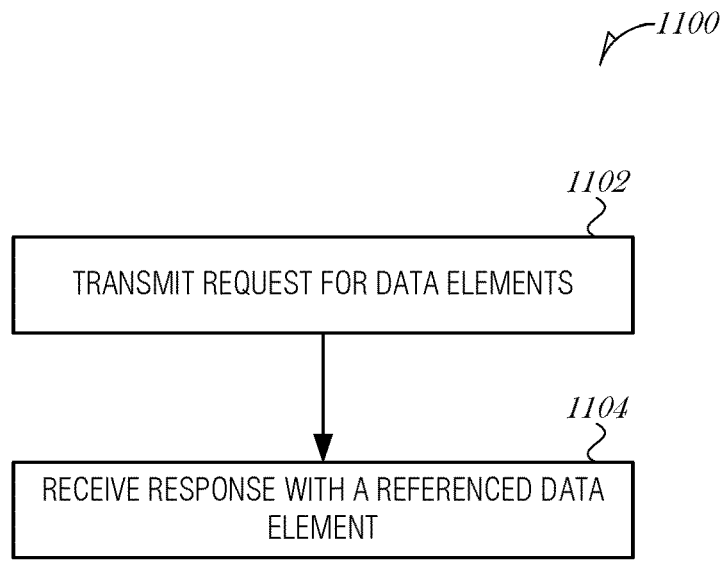
FIG. 11 is a flowchart illustrating a method for providing a verifier system, according to an embodiment.

FIG. 11 is a flowchart illustrating a method 1100 for providing a verifier system, according to an embodiment. At 1102, a request is transmitted to a personal device for data elements stored on the personal device, where each data element is respectively identified with a unique identifier. In an embodiment, the request specifies a document for a data element in a package, which was issued by reference to a data element from another package.

In an embodiment, transmitting the request for data elements includes requesting data elements having a minimum confidence level.

In an embodiment, transmitting the request for data elements includes requesting data elements using an expression formatted using a database query syntax, the expression describing the relationship between the packages used to issue the data elements.

At 1104, a response from the personal device is received, the response including data elements that meet the request, the data elements including a data element from a package that includes a referenced data element. In an embodiment, the referenced data element is associated with a uniform resource identifier related to an issuer of the referenced data element.

Figure 12:
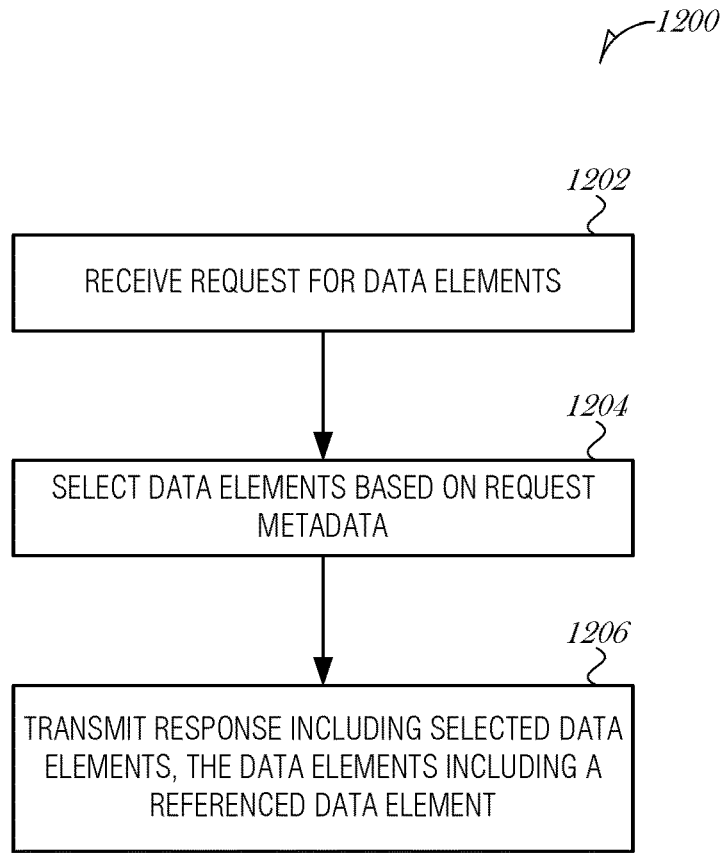
FIG. 12 is a flowchart illustrating a method for providing data from a personal device, according to an embodiment.

FIG. 12 is a flowchart illustrating a method 1200 for providing data from a personal device, according to an embodiment. At 1202, a request for data elements is received, where each data element is respectively identified with a unique identifier.

At 1204, data elements are selected based on request metadata. In an embodiment, the metadata includes a minimum confidence level for the data elements. In a further embodiment, the data elements have different confidence levels. In a further embodiment, a data element is associated with a request confidence level and a response confidence level.

In an embodiment, the metadata includes a SQL-helper to define an expected relationship between packages containing the data elements.

At 1206, a response including data elements is transmitted, the data elements including a data element from a package that includes a referenced data element. In an embodiment, the referenced data element is associated with a uniform resource identifier related to an issuer of the referenced data element.

Figure 13:
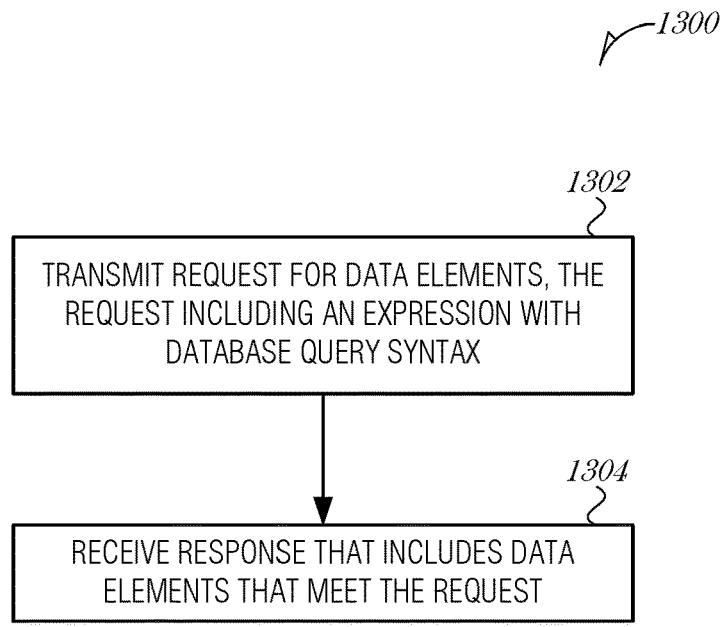
FIG. 13 is a flowchart illustrating a method for using a verifier system to validate data, according to an embodiment.

FIG. 13 is a flowchart illustrating a method 1300 for using a verifier system to validate data, according to an embodiment. At 1302, a request for data elements from a personal device is transmitted, where each data element is respectively identified with a unique identifier. The request includes an expression formatted using a database query syntax, the expression describing the relationship between the packages used to select the data elements to be returned in a response. In an embodiment, transmitting the request includes requesting data elements having a minimum confidence level.

At 1304, the response from the personal device is received, where the response includes data elements that meet the request. In an embodiment, the data elements in the response include a referenced data element that is associated with a uniform resource identifier related to an issuer of the referenced data element.

In an embodiment, the packages used to issue the data elements include a referenced data element that is associated with a uniform resource identifier related to an issuer of the referenced data element. In a further embodiment, the uniform resource identifier is a uniform resource locator. In a further embodiment, the uniform resource locator includes an address of the issuer of the referenced data element, a source data package identifier of a source package that includes the referenced data element, and a source data package hash value. The uniform resource locator may include an index value of the data element that describes a location of the data element in the source data package.

Figure 14:
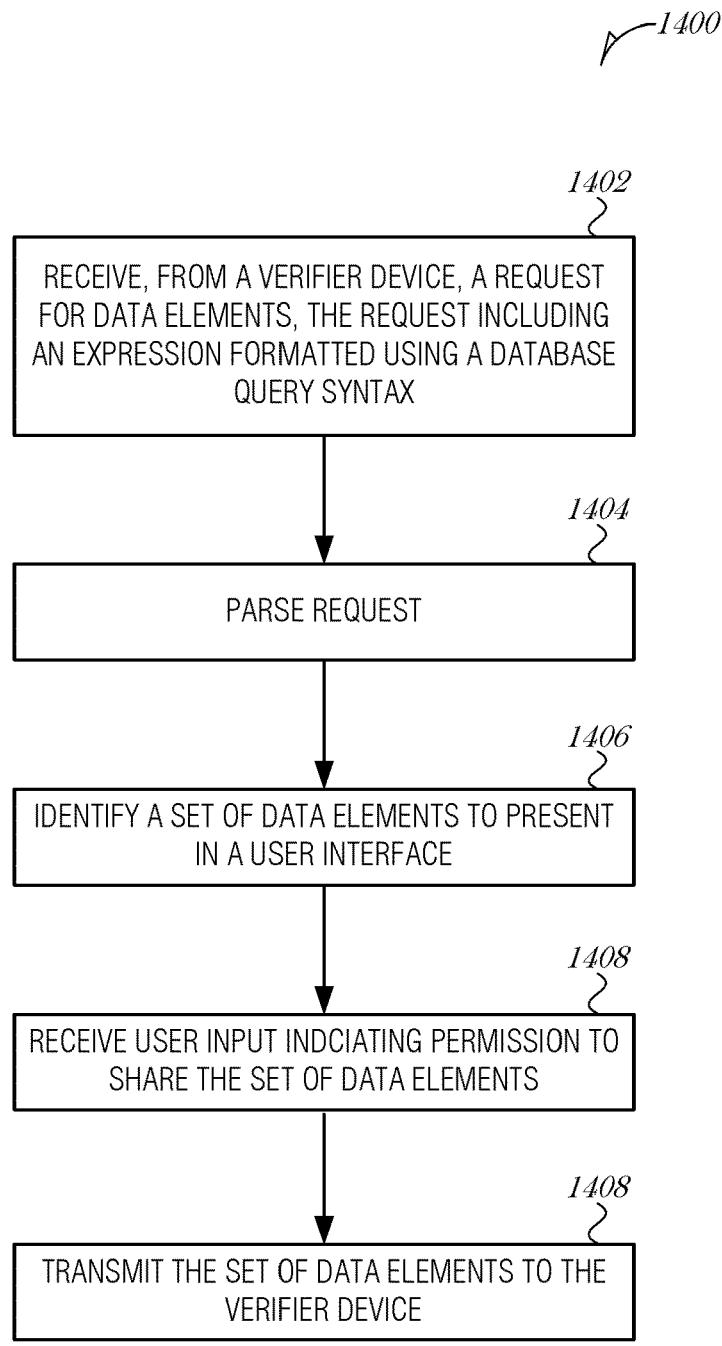
FIG. 14 is a flowchart illustrating a method for using database query syntax in complement to a request for data, according to an embodiment.

FIG. 14 is a flowchart illustrating a method 1400 for using database query syntax in complement to a request for data, according to an embodiment. At 1402, a request for data elements stored on a personal device is received. The request originated from a verifier device and includes an expression formatted using a database query syntax, with the expression describing the relationship between the packages used to select the data elements to be returned in a response. In an embodiment, the expression is formatted using a structure query language (SQL) syntax.

In an embodiment, two data elements in the expression are defined by different namespaces. In a further embodiment, the data elements are organized into tables, and the expression is used to query the tables. In another embodiment, the expression references a data element by namespace. In a further embodiment, the expression references a document for at least one data element. In an embodiment, documents with data elements from different namespaces are organized into namespace-specific databases.

At 1404, the expression is parsed to scan packages of data elements issued to the personal device.

In an embodiment, the packages of data elements include a referenced data element that is associated with a uniform resource identifier related to an issuer of the referenced data element. In a further embodiment, the uniform resource identifier is a uniform resource locator. In a further embodiment, the uniform resource locator includes an address of the issuer of the referenced data element, a source data package identifier of a source package that includes the referenced data element, and a source data package hash value. In a further embodiment, the uniform resource locator comprises an index value of the data element that describes a location of the data element in the source data package.

At 1406, a set of data elements to present in a user interface to a user of the personal device is identified. The user interface is to provide the option of whether to permit the verifier device access to the set of data elements using a single user interface action. The single user action may be a single soft click in a graphical user interface.

At 1408, input from the user indicating that the user approves sharing the set of credentials with the verifier device is received.

At 1410, the set of data elements is transmitted to the verifier device.

Example Use Case

In a preliminary step, the end user is informed about an application(s) to use for the credentials of a given issuer. Installation of the application may be driven from a list of authorized applications from the given issuer, which may also embed links to install the application from an adequate app store.

Once an application has been installed, the end user may request a standalone package from within the application or otherwise information to trigger the acquisition is redeemed in the application. In the case where the request is performed from within the application and the end user opts for the package to be delivered to that same application, the package is shown as pending when the request has been submitted and then changes after the actual package has been received. The package could show empty until confirmed or better it shows with all data elements yet marked as pending. Alternatively, the application may acquire a standalone package by receiving the address to connect to and download the target package using common techniques such as MagicLink or DeepLinking, etc. where the URL contains information for both the target application and the address of the target package.

While the target package may be identified solely by a unique identifier when the application knows which backend to connect to, in the more generic implementation the full URL to acquire the target package is received. For example, the URI for a package "https://issuer_Address.com/package_identifier/hash/signature/etc" may be encoded as a parameter to append to the URL to call the application as follows: "https://issuer_Address.com/package_identifier/hash/signature/etc". Finally, a digital signature that has been added to the parameters is checked to ensure the application will not connect to a malicious site or address.

To authorize an application a connection uses TLS with mutual authentication and a sole application is authorized for the package. In such a case, the application certificate is received (for example during the identification of the application that could be used by an issuer to determine if the application is legitimate), then pinned by the issuer to control access to the content. For the TLS session the issuer site has a certificate from an authorized trusted authority (TA) of the application.

As an alternative, to authorize the application other security techniques such as chaining, combining information provided by the phone browser such as model, etc., may be used.

More standalone packages may be acquired following the available process. All packages are delivered with a URI for the application to check for updates and for data elements to be referenced. The packages may also be delivered with the necessary data to fetch registration templates for additional packages—typically aggregated—that may be requested from within the application. Such registration templates may embed information that makes it easy for the user interface to pick data element(s) from package(s) that should be referenced.

In some embodiment, the user interface may only provide the option to register the new information and take advantage of the template information to automatically select appropriate data element(s) to reference from package(s) where it belongs. The template information may specify the tag of the data elements to reference and either or a combination of for example the kind of document, the issuer, the name of the package, or other information that allows to identify a package without using personalized data such as a package identifier.

To acquire an aggregated package the user may register from within the application for a document that results in one or more aggregated packages. A verification to acquire information about the data elements to reference and more particularly the URI of the package is then used. The application receives the URI of the aggregated package during these preliminary steps and the user interface shows a pending package as well as related information to the package. In the case of registering from within the application, the pending package may show all the information that has been submitted and only inform that it is pending (for example because the issuer signature has not been received yet).

After the package is downloaded, the update process kicks in (notification to the application from the issuer, scheduled pulling, etc.) and the package is updated. In some cases, the issuer (or re-issuer) delivers a package that can overwrite the existing one and in some other cases the issuer delivers only the information that has been modified or added. The package is signed for integrity, authenticity, and for binding the data elements and referenced data element together.

Once a package URI is received, it may refer to a new package or an update to an existing package. The application uses an HTTPS GET commands with information from the URI to acquire the package. The body of the command may contain the package identifier and other information from the URI. Once the package is received and has been checked for integrity, the application may execute the applicable rules from the various issuers involved (i.e., including rules from issuer from referenced package) and may fetch the missing packages, notify the adequate issuer referencing the package about the update, notify the adequate referenced package issuer(s) about the referencing issuer, or set a schedule for checking for updates for that particular package.

The application uses an HTTPS PUT command with information from the URI to notify an issuer about the event related to their issued package. The body in the PUT command contains information about the kind of event and provides the URI of the other issuer package.

Overall the application simply manages URI to check for updates and to maintain the relationship between packages. Updates are triggered automatically from notification from the individual issuers.

The URI of acquired package(s) is also recorded in a backend system where the information is protected to ensure only the right user can authorize access to the information. Such back up facilitates changing mobile devices and when authorized to install the packages on multiple devices owned by the same user.

In some cases, the PUT commands are also used to interface with a blockchain that is personal to the end user and the information is populated either by the end user application or by the issuers or both.

When a package is removed from the application, the application notifies the issuer with an HTTPS DEL command and using information from the deleted package URI. This may also be used to confirm that a package has been deleted from the application, the backend or marked as deleted in the personal blockchain.

Issuers of related packages may be notified about the event as well using an HTTPS PUT command as described above.

For verification, the end user engages with a verifier and the application receives the request. The request also embeds a query which drives the steps in the user interface and makes it easy for the end user to select and consent to share the requested data elements. The verifier receives the response that may contain multiple packages. In the case where a package has been tokenized, the verifier may use the HTTPS POST command with information from the package URI to check about the status of the current token for the package.

Example System Components

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

As used in any embodiment herein, the term "logic" may refer to firmware and/or circuitry configured to perform any of the aforementioned operations. Firmware may be embodied as code, instructions or instruction sets and/or data that are hard-coded (e.g., nonvolatile) in memory devices and/or circuitry.

Figure 15:
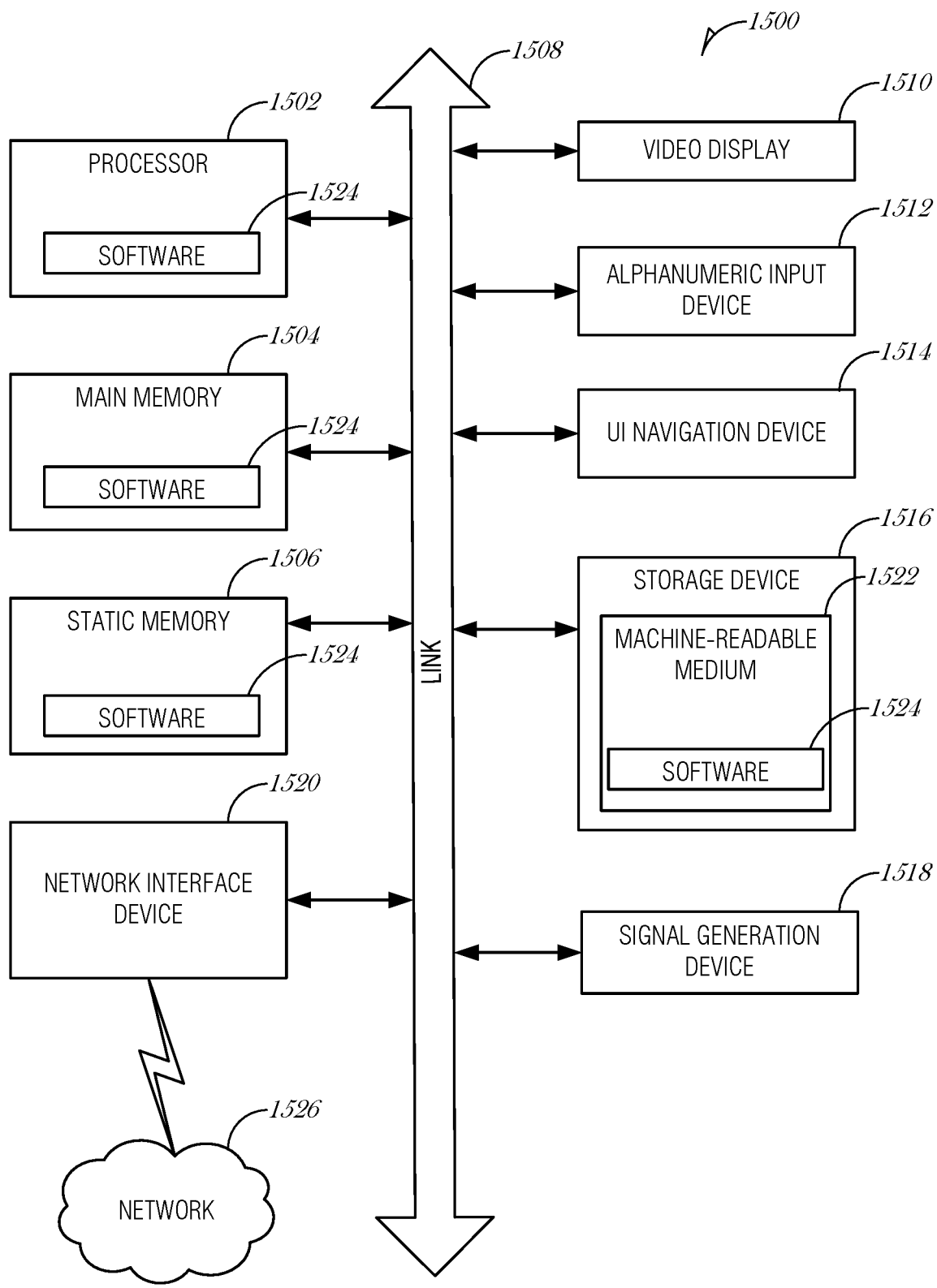
FIG. 15 is a block diagram illustrating an example machine upon which any one or more of the techniques (e.g., methodologies) discussed herein may perform, according to an embodiment.

"Circuitry," as used in any embodiment herein, may comprise, for example, singly or in any combination, hardwired circuitry, programmable circuitry, state machine circuitry, logic and/or firmware that stores instructions executed by programmable circuitry. The circuitry may be embodied as an integrated circuit, such as an integrated circuit chip. In some embodiments, the circuitry may be formed, at least in part, by the processor circuitry executing code and/or instructions sets (e.g., software, firmware, etc.) corresponding to the functionality described herein, thus transforming a general-purpose processor into a specific-purpose processing environment to perform one or more of the operations described herein. In some embodiments, the processor circuitry may be embodied as a stand-alone integrated circuit or may be incorporated as one of several components on an integrated circuit. In some embodiments, the various components and circuitry of the node or other systems may be combined in a system-on-a-chip (SoC) architecture FIG. 15 is a block diagram illustrating a machine in the example form of a computer system 1500, within which a set or sequence of instructions may be executed to cause the machine to perform any one of the methodologies discussed herein, according to an embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a mobile device, a personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 1500 includes at least one processor 1502 (e.g., a central processing unit (CPU), a graphics processing unit (GPU) or both, processor cores, compute nodes, etc.), a main memory 1504 and a static memory 1506, which communicate with each other via a link 1508 (e.g., bus). The computer system 1500 may further include a video display unit 1510, an alphanumeric input device 1512 (e.g., a keyboard), and a user interface (UI) navigation device 1514 (e.g., a mouse). In one embodiment, the video display unit 1510, input device 1512 and UI navigation device 1514 are incorporated into a touch screen display. The computer system 1500 may additionally include a storage device 1516 (e.g., a drive unit), a signal generation device 1518 (e.g., a speaker), a network interface device 1520, and one or more sensors (not shown), such as a global positioning system (GPS) sensor, compass, accelerometer, gyrometer, magnetometer, or another sensor.

The storage device 1516 includes a machine-readable medium 1522 on which is stored one or more sets of data structures and instructions 1524 (e.g., software) embodying or utilized by any one or more of the methodologies or functions described herein. The instructions 1524 may also reside, completely or at least partially, within the main memory 1504, static memory 1506, and/or within the processor 1502 during execution thereof by the computer system 1500, with the main memory 1504, static memory 1506, and the processor 1502 also constituting machine-readable media.

While the machine-readable medium 1522 is illustrated in an example embodiment to be a single medium, the term "machine-readable medium" may include a single medium or multiple media (e.g., a centralized or distributed database, and/or associated caches and servers) that store the one or more instructions 1524. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include nonvolatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 1524 may further be transmitted or received over a communications network 1526 using a transmission medium via the network interface device 1520 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A, 5G, DSRC, or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Examples

Example 1 is a data aggregation system comprising: a processor subsystem; and a memory device including instructions, which when executed by the processor subsystem, cause the processor subsystem to perform operations comprising: requesting a data element from an issuer, wherein the data element is identified with a unique identifier; receiving a response from the issuer; and preparing an aggregated data package to issue, wherein the data element from the issuer is included by reference with a uniform resource identifier related to the issuer.

In Example 2, the subject matter of Example 1 includes, wherein requesting the data element comprises requesting a reference to the data element and wherein the response from the issuer includes the uniform resource identifier.

In Example 3, the subject matter of Examples 1-2 includes, wherein the instructions cause the processor subsystem to perform operations comprising: detecting an update to a source data package containing the data element from the issuer; and requesting an updated version of the data element from the issuer based on the update to the source data package.

In Example 4, the subject matter of Example 3 includes, wherein the uniform resource identifier includes an address of the issuer, a source data package identifier of the source data package, and a source data package hash value of the source data package, and wherein detecting the update comprises: using the source data package hash value to determine whether the data package is current; and initiating the request for the updated version of the data element when the data package is not current.

In Example 5, the subject matter of Examples 1-4 includes, wherein requesting the data element from the issuer includes requesting data elements having a minimum confidence level.

In Example 6, the subject matter of Examples 1-5 includes, wherein the requested data elements are delivered in a source data package and the source data package has a confidence level.

In Example 7, the subject matter of Examples 1-6 includes, wherein the response includes a network location of the data element without a value of the data element.

In Example 8, the subject matter of Examples 1-7 includes, wherein the response includes a network location of the data element and a value of the data element.

In Example 9, the subject matter of Examples 1-8 includes, wherein the aggregated data package to issue is assigned a confidence level.

In Example 10, the subject matter of Example 9 includes, wherein the instructions cause the processor subsystem to perform operations comprising: issuing a credential that includes the aggregated data package to issue, wherein each data package in the credential has a respective confidence level.

In Example 11, the subject matter of Examples 1-10 includes, wherein a confidence level for the data element from the issuer is inherited from the issuer.

In Example 12, the subject matter of Examples 1-11 includes, wherein the uniform resource identifier is a uniform resource locator.

In Example 13, the subject matter of Example 12 includes, wherein the uniform resource locator includes an address of the issuer, a source data package identifier, and a source data package hash value.

In Example 14, the subject matter of Example 13 includes, wherein the uniform resource locator comprises an index value of the data element that describes a location of the data element in the source data package.

In Example 15, the subject matter of Examples 13-14 includes, wherein the instructions cause the processor subsystem to perform operations comprising: using the source data package hash value to determine whether the data package is current; and obtaining a revised data package when the data package is not current.

Example 16 is a method for providing a data aggregation system, the method comprising: requesting a data element from an issuer, wherein the data element is identified with a unique identifier; receiving a response from the issuer; and preparing an aggregated data package to issue, wherein the data element from the issuer is included by reference with a uniform resource identifier related to the issuer.

In Example 17, the subject matter of Example 16 includes, wherein requesting the data element comprises requesting a reference to the data element and wherein the response from the issuer includes the uniform resource identifier.

In Example 18, the subject matter of Examples 16-17 includes, detecting an update to a source data package containing the data element from the issuer; and requesting an updated version of the data element from the issuer based on the update to the source data package.

In Example 19, the subject matter of Example 18 includes, wherein the uniform resource identifier includes an address of the issuer, a source data package identifier of the source data package, and a source data package hash value of the source data package, and wherein detecting the update comprises: using the source data package hash value to determine whether the data package is current; and initiating the request for the updated version of the data element when the data package is not current.

In Example 20, the subject matter of Examples 16-19 includes, wherein requesting the data element from the issuer includes requesting data elements having a minimum confidence level.

In Example 21, the subject matter of Examples 16-20 includes, wherein the requested data elements are delivered in a source data package and the source data package has a confidence level.

In Example 22, the subject matter of Examples 16-21 includes, wherein the response includes a network location of the data element without a value of the data element.

In Example 23, the subject matter of Examples 16-22 includes, wherein the response includes a network location of the data element and a value of the data element.

In Example 24, the subject matter of Examples 16-23 includes, wherein the aggregated data package to issue is assigned a confidence level.

In Example 25, the subject matter of Example 24 includes, issuing a credential that includes the aggregated data package to issue, wherein each data package in the credential has a respective confidence level.

In Example 26, the subject matter of Examples 16-25 includes, wherein a confidence level for the data element from the issuer is inherited from the issuer.

In Example 27, the subject matter of Examples 16-26 includes, wherein the uniform resource identifier is a uniform resource locator.

In Example 28, the subject matter of Example 27 includes, wherein the uniform resource locator includes an address of the issuer, a source data package identifier, and a source data package hash value.

In Example 29, the subject matter of Example 28 includes, wherein the uniform resource locator comprises an index value of the data element that describes a location of the data element in the source data package.

In Example 30, the subject matter of Examples 28-29 includes, using the source data package hash value to determine whether the data package is current; and obtaining a revised data package when the data package is not current.

Example 31 is at least one machine-readable medium including instructions, which when executed by a machine, cause the machine to perform operations of any of the methods of Examples 16-30.

Example 32 is an apparatus comprising means for performing any of the methods of Examples 16-30.

Example 33 is a verifier system comprising: a processor subsystem; and a memory device including instructions, which when executed by the processor subsystem, cause the processor subsystem to perform operations comprising: transmitting a request for data elements from a personal device, wherein each data element is respectively identified with a unique identifier; and receiving a response from the personal device, the response including data elements that meet the request, the data elements including a data element from a package that includes, a referenced data element.

In Example 34, the subject matter of Example 33 includes, wherein the request specifies a document for a data element in a package, which was issued by reference to a data element from another package.

In Example 35, the subject matter of Examples 33-34 includes, wherein the referenced data element is associated with a uniform resource identifier related to an issuer of the referenced data element.

In Example 36, the subject matter of Examples 33-35 includes, wherein transmitting the request includes requesting data elements having a minimum confidence level.

In Example 37, the subject matter of Examples 33-36 includes, wherein transmitting the request includes requesting data elements using an expression formatted using a database query syntax, the expression describing the relationship between the packages used to issue the data elements.

Example 38 is a method for providing a verifier system, the method comprising: transmitting a request for data elements from a personal device, wherein each data element is respectively identified with a unique identifier; and receiving a response from the personal device, the response including data elements that meet the request, the data elements including a data element from a package that includes, a referenced data element.

In Example 39, the subject matter of Example 38 includes, wherein the request specifies a document for a data element in a package, which was issued by reference to a data element from another package.

In Example 40, the subject matter of Examples 38-39 includes, wherein the referenced data element is associated with a uniform resource identifier related to an issuer of the referenced data element.

In Example 41, the subject matter of Examples 38-40 includes, wherein transmitting the request includes requesting data elements having a minimum confidence level.

In Example 42, the subject matter of Examples 38-41 includes, wherein transmitting the request includes requesting data elements using an expression formatted using a database query syntax, the expression describing the relationship between the packages used to issue the data elements.

Example 43 is at least one machine-readable medium including instructions, which when executed by a machine, cause the machine to perform operations of any of the methods of Examples 38-42.

Example 44 is an apparatus comprising means for performing any of the methods of Examples 38-42.

Example 45 is a personal device comprising: a processor subsystem; and a memory device including instructions, which when executed by the processor subsystem, cause the processor subsystem to perform operations comprising: receiving a request for data elements, wherein each data element is respectively identified with a unique identifier; selecting data elements based on request metadata; and transmitting a response including data elements, the data elements including a data element from a package that includes, a referenced data element.

In Example 46, the subject matter of Example 45 includes, wherein the referenced data element is associated with a uniform resource identifier related to an issuer of the referenced data element.

In Example 47, the subject matter of Examples 45-46 includes, wherein the metadata includes a minimum confidence level for the data elements.

In Example 48, the subject matter of Example 47 includes, wherein the data elements have different confidence levels.

In Example 49, the subject matter of Example 48 includes, wherein a data element is associated with a request confidence level and a response confidence level.

In Example 50, the subject matter of Examples 45-49 includes, wherein the metadata includes a SQL-helper to define an expected relationship between packages containing the data elements.

Example 51 is a method for providing data from a personal device, the method comprising: receiving a request for data elements, wherein each data element is respectively identified with a unique identifier; selecting data elements based on request metadata; and transmitting a response including data elements, the data elements including a data element from a package that includes, a referenced data element.

In Example 52, the subject matter of Example 51 includes, wherein the referenced data element is associated with a uniform resource identifier related to an issuer of the referenced data element.

In Example 53, the subject matter of Examples 51-52 includes, wherein the metadata includes a minimum confidence level for the data elements.

In Example 54, the subject matter of Example 53 includes, wherein the data elements have different confidence levels.

In Example 55, the subject matter of Example 54 includes, wherein a data element is associated with a request confidence level and a response confidence level.

In Example 56, the subject matter of Examples 51-55 includes, wherein the metadata includes a SQL-helper to define an expected relationship between packages containing the data elements.

Example 57 is at least one machine-readable medium including instructions, which when executed by a machine, cause the machine to perform operations of any of the methods of Examples 51-56.

Example 58 is an apparatus comprising means for performing any of the methods of Examples 51-56.

Example 59 is a verifier system comprising: a processor subsystem; and a memory device including instructions, which when executed by the processor subsystem, cause the processor subsystem to perform operations comprising: transmitting a request for data elements from a personal device, wherein each data element is respectively identified with a unique identifier, wherein the request includes, an expression formatted using a database query syntax, the expression describing the relationship between the packages used to select the data elements to be returned in a response; and receiving the response from the personal device, the response including data elements that meet the request.

In Example 60, the subject matter of Example 59 includes, wherein transmitting the request includes requesting data elements having a minimum confidence level.

In Example 61, the subject matter of Examples 59-60 includes, wherein the data elements in the response include a referenced data element that is associated with a uniform resource identifier related to an issuer of the referenced data element.

In Example 62, the subject matter of Examples 59-61 includes, wherein the packages used to issue the data elements include a referenced data element that is associated with a uniform resource identifier related to an issuer of the referenced data element.

In Example 63, the subject matter of Example 62 includes, wherein the uniform resource identifier is a uniform resource locator.

In Example 64, the subject matter of Example 63 includes, wherein the uniform resource locator includes an address of the issuer of the referenced data element, a source data package identifier of a source package that includes the referenced data element, and a source data package hash value.

In Example 65, the subject matter of Example 64 includes, wherein the uniform resource locator comprises an index value of the data element that describes a location of the data element in the source data package.

Example 66 is a method of using a verifier system to validate data, the method comprising: transmitting a request for data elements from a personal device, wherein each data element is respectively identified with a unique identifier, wherein the request includes, an expression formatted using a database query syntax, the expression describing the relationship between the packages used to select the data elements to be returned in a response; and receiving the response from the personal device, the response including data elements that meet the request.

In Example 67, the subject matter of Example 66 includes, wherein transmitting the request includes requesting data elements having a minimum confidence level.

In Example 68, the subject matter of Examples 66-67 includes, wherein the data elements in the response include a referenced data element that is associated with a uniform resource identifier related to an issuer of the referenced data element.

In Example 69, the subject matter of Examples 66-68 includes, wherein the packages used to issue the data elements include a referenced data element that is associated with a uniform resource identifier related to an issuer of the referenced data element.

In Example 70, the subject matter of Example 69 includes, wherein the uniform resource identifier is a uniform resource locator.

In Example 71, the subject matter of Example 70 includes, wherein the uniform resource locator includes an address of the issuer of the referenced data element, a source data package identifier of a source package that includes the referenced data element, and a source data package hash value.

In Example 72, the subject matter of Example 71 includes, wherein the uniform resource locator comprises an index value of the data element that describes a location of the data element in the source data package.

Example 73 is at least one machine-readable medium including instructions, which when executed by a machine, cause the machine to perform operations of any of the methods of Examples 66-72.

Example 74 is an apparatus comprising means for performing any of the methods of Examples 66-72.

Example 75 is a personal device for using database query syntax in complement to a request for data, the device comprising: a processor subsystem; and a memory device including instructions, which when executed by the processor subsystem, cause the processor subsystem to perform operations comprising: receiving, from a verifier device, a request for data elements stored on the personal device, the request including an expression formatted using a database query syntax, the expression describing the relationship between the packages used to select the data elements to be returned in a response; parsing the expression to scan packages of data elements issued to the personal device; identifying a set of data elements to present in a user interface to a user of the personal device, the user interface to provide the option of whether to permit the verifier device access to the set of data elements using a single user interface action; receiving input from the user indicating that the user approves sharing the set of credentials with the verifier device; and transmitting the set of data elements to the verifier device.

In Example 76, the subject matter of Example 75 includes, wherein the expression is formatted using a structure query language (SQL) syntax.

In Example 77, the subject matter of Examples 75-76 includes, wherein two data elements in the expression are defined by different namespaces.

In Example 78, the subject matter of Example 77 includes, wherein the data elements are organized into tables, and the expression is used to query the tables.

In Example 79, the subject matter of Examples 77-78 includes, wherein the expression references a data element by namespace.

In Example 80, the subject matter of Example 79 includes, wherein the expression references a document for at least one data element.

In Example 81, the subject matter of Examples 77-80 includes, wherein documents with data elements from different namespaces are organized into namespace-specific databases.

In Example 82, the subject matter of Examples 75-81 includes, wherein the packages of data elements include a referenced data element that is associated with a uniform resource identifier related to an issuer of the referenced data element.

In Example 83, the subject matter of Example 82 includes, wherein the uniform resource identifier is a uniform resource locator.

In Example 84, the subject matter of Example 83 includes, wherein the uniform resource locator includes an address of the issuer of the referenced data element, a source data package identifier of a source package that includes the referenced data element, and a source data package hash value.

In Example 85, the subject matter of Example 84 includes, wherein the uniform resource locator comprises an index value of the data element that describes a location of the data element in the source data package.

Example 86 is a method for using database query syntax in complement to a request for data, the method comprising: receiving, at a personal device from a verifier device, a request for data elements stored on the personal device, the request including an expression formatted using a database query syntax, the expression describing the relationship between the packages used to select the data elements to be returned in a response; parsing the expression to scan packages of data elements issued to the personal device; identifying a set of data elements to present in a user interface to a user of the personal device, the user interface to provide the option of whether to permit the verifier device access to the set of data elements using a single user interface action; receiving input from the user indicating that the user approves sharing the set of credentials with the verifier device; and transmitting the set of data elements to the verifier device.

In Example 87, the subject matter of Example 86 includes, wherein the expression is formatted using a structure query language (SQL) syntax.

In Example 88, the subject matter of Examples 86-87 includes, wherein two data elements in the expression are defined by different namespaces.

In Example 89, the subject matter of Example 88 includes, wherein the data elements are organized into tables, and the expression is used to query the tables.

In Example 90, the subject matter of Examples 88-89 includes, wherein the expression references a data element by namespace.

In Example 91, the subject matter of Example 90 includes, wherein the expression references a document for at least one data element.

In Example 92, the subject matter of Examples 88-91 includes, wherein documents with data elements from different namespaces are organized into namespace-specific databases.

In Example 93, the subject matter of Examples 86-92 includes, wherein the packages of data elements include a referenced data element that is associated with a uniform resource identifier related to an issuer of the referenced data element.

In Example 94, the subject matter of Example 93 includes, wherein the uniform resource identifier is a uniform resource locator.

In Example 95, the subject matter of Example 94 includes, wherein the uniform resource locator includes an address of the issuer of the referenced data element, a source data package identifier of a source package that includes the referenced data element, and a source data package hash value.

In Example 96, the subject matter of Example 95 includes, wherein the uniform resource locator comprises an index value of the data element that describes a location of the data element in the source data package.

Example 97 is at least one machine-readable medium including instructions, which when executed by a machine, cause the machine to perform operations of any of the methods of Examples 86-96.

Example 98 is an apparatus comprising means for performing any of the methods of Examples 86-96.

Example 99 is at least one machine-readable medium including instructions that, when executed by processing circuitry, cause the processing circuitry to perform operations to implement of any of Examples 1-98.

Example 100 is an apparatus comprising means to implement of any of Examples 1-98.

Example 101 is a system to implement of any of Examples 1-98.

Example 102 is a method to implement of any of Examples 1-98.

Additional Notes:

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A data aggregation system comprising:
a processor subsystem; and
a memory device including instructions, which when executed by the processor subsystem, cause the processor subsystem to perform operations comprising:
requesting a data element from an issuer, wherein the data element is identified with a unique identifier;
receiving a response from the issuer; and
preparing an aggregated data package to issue, wherein the data element from the issuer is included by reference with a uniform resource identifier related to the issuer, wherein the uniform resource identifier includes an address of the issuer, a source data package identifier of a source data package containing the data element from the issuer, and a source data package hash value of the source data package.

2. The system of claim 1, wherein requesting the data element comprises requesting a reference to the data element and wherein the response from the issuer includes the uniform resource identifier.

3. The system of claim 1, wherein the instructions cause the processor subsystem to perform operations comprising:
detecting an update to the source data package; and
requesting an updated version of the data element from the issuer based on the update to the source data package.

4. The system of claim 3, wherein detecting the update comprises:
using the source data package hash value to determine whether the source data package is current; and
initiating the request for the updated version of the data element when the source data package is not current.

5. The system of claim 1, wherein requesting the data element from the issuer includes requesting a data element having a minimum confidence level.

6. The system of claim 1, wherein the data element is delivered in the source data package and the source data package has a confidence level.

7. The system of claim 1, wherein the aggregated data package to issue is assigned a confidence level.

8. The system of claim 7, wherein the instructions cause the processor subsystem to perform operations comprising:
issuing a credential that includes the aggregated data package to issue, wherein each data package in the credential has a respective confidence level.

9. The system of claim 1, wherein a confidence level for the data element from the issuer is inherited from the issuer.

10. At least one machine-readable medium including instructions, which when executed by a machine, cause the machine to perform operations of:
transmitting a request for data elements from a personal device, wherein each data element is respectively identified with a unique identifier; and
receiving a response from the personal device, the response including data elements from multiple issuers that meet the request, the data elements from multiple issuers including at least one data element from a package that includes a referenced data element.

11. The at least one machine-readable medium of claim 10, wherein the request specifies a document for a data element in a package, which was issued by reference to a data element from another package.

12. The at least one machine-readable medium of claim 10, wherein the referenced data element is associated with a uniform resource identifier related to an issuer of the referenced data element.

13. The at least one machine-readable medium of claim 10, wherein transmitting the request includes requesting one or more data elements having a minimum confidence level.

14. The at least one machine-readable medium of claim 10, wherein transmitting the request includes requesting data elements using an expression formatted using a database query syntax, the expression describing the relationship between the packages used to issue the data elements.

15. At least one machine-readable medium including instructions, which when executed by a machine, cause the machine to perform operations of:
receiving a request for data elements, wherein each data element of the request is respectively identified with a unique identifier;
selecting response data elements based on request metadata, wherein the request metadata includes a minimum confidence level for one or more of the data elements of the request, the confidence level for any given data element corresponding, at least in part, to a relevance of an issuer for the given data element; and
transmitting a response including the response data elements, the response data elements including a data element from a package that includes a referenced data element.

16. The at least one machine-readable medium of claim 15, wherein the referenced data element is associated with a uniform resource identifier related to an issuer of the referenced data element.

17. The at least one machine-readable medium of claim 15, wherein the response data elements have different confidence levels.

18. The at least one machine-readable medium of claim 17, wherein at least one response data element is associated with a request confidence level and a response confidence level.

19. The at least one machine-readable medium of claim 15, wherein the request metadata includes an SQL-helper to define an expected relationship between packages containing the response data elements.

* * * * *